US006285766B1

(12) United States Patent
Kumamoto

(10) Patent No.: US 6,285,766 B1
(45) Date of Patent: Sep. 4, 2001

(54) APPARATUS FOR LOCALIZATION OF SOUND IMAGE

(75) Inventor: Yoshinori Kumamoto, Iizukashi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/107,458

(22) Filed: Jun. 30, 1998

(30) Foreign Application Priority Data

Jun. 30, 1997 (JP) .................................................. 9-173576

(51) Int. Cl.[7] ............................... H04R 5/00; H02B 1/00

(52) U.S. Cl. ............................................. 381/17; 381/123

(58) Field of Search .................................. 381/1, 17, 61, 381/63, 123, 18, 303, 304, 305, 310

(56) References Cited

U.S. PATENT DOCUMENTS

| | | | | |
|---|---|---|---|---|
| 4,192,969 | | 3/1980 | Iwahara . | |
| 4,388,494 | * | 6/1983 | Schone et al. | 381/1 |
| 4,980,914 | * | 12/1990 | Kunugi et al. | 381/1 |
| 5,105,462 | | 4/1992 | Lowe et al. | 381/17 |
| 5,384,851 | * | 1/1995 | Fujimori | 381/17 |
| 5,412,731 | | 5/1995 | Desper | 381/1 |
| 5,509,078 | * | 4/1996 | Hiraoka et al. | 381/1 |
| 5,590,204 | | 12/1996 | Lee | 381/24 |
| 5,596,644 | | 1/1997 | Abel et al. | 381/17 |
| 5,701,344 | * | 12/1997 | Wakui | 381/1 |
| 5,715,317 | | 2/1998 | Nakazawa | 381/17 |
| 5,995,631 | * | 11/1999 | Kamada et al. | 381/17 |
| 5,999,630 | * | 12/1999 | Iwamatsu | 381/17 |

FOREIGN PATENT DOCUMENTS

| | | | | |
|---|---|---|---|---|
| 2-260800 | * | 10/1990 | (JP) | 381/300 |
| 3-250900 | | 11/1991 | (JP) . | |
| 3-270400 | | 12/1991 | (JP) . | |
| 4-273800 | | 9/1992 | (JP) . | |
| 5-191894 | | 7/1993 | (JP) . | |
| 9-327099 | | 12/1997 | (JP) . | |

* cited by examiner

*Primary Examiner*—Xu Mei
(74) *Attorney, Agent, or Firm*—Parkhurst & Wendel, L.L.P.

(57) ABSTRACT

A sound image localization apparatus comprises crosstalk canceling means and direction localizing means, wherein first the crosstalk canceling means first subject an input sound signal to crosstalk cancellation, and then, the direction localizing means subject the processed signal to directional localization, whereby both crosstalk cancellation and directional localization share a signal to be processed, so the necessary amount of a storage device to hold the signal is reduced. That is, a reduction in circuit scale and calculation load can provide a sound image localization apparatus with low cost and high processing precision.

10 Claims, 17 Drawing Sheets

Fig.18 (b) PRIOR ART

Fig.19 (b) PRIOR ART

APPARATUS FOR LOCALIZATION OF SOUND IMAGE

FIELD OF THE INVENTION

The present invention relates to an apparatus for localization of a sound image and, more particularly, to an apparatus for localization of a sound image which receives a sound signal, subjects the sound signal to signal processing, localizes a virtual sound image, and outputs a sound image localization signal.

BACKGROUND OF THE INVENTION

A conventional stereophonic system controls sound image localization using a plural of (generally two) loudspeakers, conferring a realistic sensation to the hearing of a listener. The conventional system usually includes two laterally spaced loudspeakers in front of the listener, so a sound image is localized between them. Outside the two loudspeakers no sound image is localized in the system. To obtain the effect that a sound image is localized outside the two loudspeakers, i.e., the surround of the listener, for instance, a sound from the back of the listener, the system sometimes includes loudspeakers at the rear as well as the two loudspeakers in front of the listener.

The development of technology for digitizing audio and hardware for DSP (Digital Signal Processor) facilitates various signal processing. Owing to this, the system using two loudspeakers in front of the listener can localize a sound image at any position around the listener, such as the side and rear of the listener.

Conventional sound image localization apparatus are disclosed in Japanese Patent Published Application Nos. Hei 3-270400 (1991); Hei 4-273800 (1992). A description will be given of a typical, conventional sound image localization apparatus.

FIGS. 19(*a*) and 19(*b*) are diagrams for explaining about sound image localization. FIG. 19(*a*) shows a sound image to be localized in a virtual way. FIG. 19(*b*) shows a system using two loudspeakers. In this case, it is assumed that the positions of virtually localized sound images, and the positions of the two loudspeakers are left-and-right symmetrical with respect to the listener.

In the sound image localization apparatus, a direction of a virtual position is localized and crosstalk is canceled by signal processing using a head related transfer function indicating transfer characteristics of sound from a sound source to the listener's head or ear.

Here, in case like FIG. 19(*b*), a crosstalk signal is a signal transferred from a left loudspeaker to a right ear, or from a right loudspeaker to left ear. A signal is generated for canceling the crosstalk signal.

In the virtual environment achieved by this system as shown in FIG. 19(*a*), sound signals uL and uR are radiated from the positions of virtual sound images located laterally at the back of the listener. Reference numerals, yL1 and yR1, indicate sound pressures given to left and right ears, respectively. Because of the left-and-right symmetry, transfer of sound from the left virtual position to the left ear is the same as that from the right virtual position to the right ear. A head related transfer function showing this transfer characteristics is indicated by TM. The transfer of sound from the left virtual position to the right ear and that from the right virtual position to the left ear are represented by the same head related transfer function TC. The relation between the sound pressures and the functions are represented by yL1=TM·uL+TC·uR (1-1) and yR1=TC·uL+TM·uR (1-2).

On the other hand, in a system shown in FIG. 19(*b*), left and right loudspeakers 1901*a* and 1901*b* radiate sound signals xL and xR, respectively. Sound pressures given to the left and right ears of the listener are yL2 and yR2, respectively. As they are left-and-right symmetrical, the transfer of sound from the left loudspeaker position to the left car and that from the right loudspeaker position to the right ear are represented by the same head related transfer function SM. The transfer of sound from the left loudspeaker position to the right ear and that from the right loudspeaker position to the left ear are also represented by the same head related transfer function SC. The relation between those sound pressures and those functions are yL2=SM·xL+SC·xR (2-1) and yR2=SC·xL+SM·xR (2-2).

In this system, to localize the positions of the sound images shown in FIG. 19(*a*) using acoustics output from the loudspeakers 1901*a* and 1901*b*, the following equations must be satisfied, yL1=yL2 (3-1) and yR1=yR2 (3-2).

The equations 3-1, 1-1, and 2-1 lead to the following equation 4-1, and the equations is 3-2, 1-2, and 2-2 lead to the following equation 4-2, TM·uL+TC·uR=SM·xL+SC·xR (4-1) and TC·uL+TM·uR=SC·xL+SM·xR (4-2).

The solution to xL and xR is obtained from the equations 4-1 and 4-2. If assumed that, the gain being represented by ═*═, $$═(SC/SM)^2═<<1 \quad (5),$$

xL and xR are approximated by xL~(FM+FC·FX)·uL+(FC+FM·FX)·uR (6-1) and xR~(FC+FM·FX)·uL+(FM+FC·FX)·uR (6-2), where FM=TM/SM (7-1), FC=TC/SM (7-2), and

FX=−SC/SM (7-3).

Using the above relations, a conventional sound image localization apparatus is constructed, shown in FIG. 18(*a*) . The conventional sound image localization apparatus comprises a crosstalk canceling means 1801, direction localizing means 1802*a* and 1802*b*, and adders 1803*a* and 1803*b*. Sound signals are input through input terminals 1804*a* and 1804*b*. Signals resulting from subjecting the input sound signals to signal processing are output through output terminals 1805*a* and 1905*b*.

The direction localizing means 1802*a* and 1802*b* process the sound signals input through the input terminals 1804*a* and 1804*b* to generate signals indicating the directions of sound image positions, respectively. The adders 1803*a* and 1803*b* add input signals. The crosstalk canceling means 1801 removes a crosstalk component of an input signal.

FIG. 18(*b*) is a diagram illustrating a detailed structure of an example of the conventional sound image localization apparatus. The crosstalk canceling means 1801 shown in FIG. 18(*a*) comprises crosstalk canceling signal generating filters 1806*a* and 1806*b*, and adders 1803*c* and 1803*d*. The direction localizing means 1802*a* and 1802*b* shown in FIG. 18(*a*) comprise main-path filters 1807*a* and 1807*b*, and crosstalk-path filters 1808*a* and 1808*b*, respectively. The combination of the main-path filter and the crosstalk-path filter is sometimes called a direction localizing filter.

The prior art sound image localization apparatus generates the outputs xL and xR according to the expressions 6-1 and 6-2. A description will be given of how the sound image localization apparatus works.

Left and right input sound signals are input through the input terminals 1804*a* and 1804*b*, respectively. The first input sound signal input through the input terminal 1804*a* is input to the main-path filter 1807*a* and the crosstalk-path filter 1808*a*. The main-path filter 1807*a* multiplies the input signal by the coefficient shown in the equation 7-1. The crosstalk-path filter 1808*a* multiplies the input signal by the coefficient shown in the equation 7-2. The outputs of the main-path filter 1807*a* and the crosstalk-path filter 1808*a* are input to the adders 1803*a* and 1803*b*, respectively.

Similarly, the second input sound signal input through the input terminal 1804*b* is input to the main-path filter 1807*b* and the crosstalk-path filter 1808*b*, where the input signal is multiplied by the coefficients expressed by 7-1 and 7-2, respectively. The outputs of the main-path filter 1807*b* and the crosstalk-path filter 1808*b* are input to the adders 1803*b* and 1803*a*, respectively.

The adders 1803*a* and 1803*b* each add input signals. The adder 1803*a* outputs a result of the addition to the adder 1803*c* and the crosstalk canceling signal generating filter 1806*a*. The crosstalk canceling signal generating filter 1806*a* multiplies the input signal by the coefficient represented by the equation 7-3 to produce a crosstalk canceling signal signal, and outputs the signal to the adder 1803*d*.

Similarly, the adder 1803*b* outputs a result of the addition to the adder 1803*d* and the crosstalk canceling signal generating filter 1806*b*. The crosstalk canceling signal generating filter 1806*b* multiplies the input signal by the coefficient represented by the equation 7-3 to produce a crosstalk canceling signal, and outputs the signal to the adder 1803*c*.

The adders 1803*c* and 1803*d* each add results of addition by the adders 1803*a* and 1803*b* to the crosstalk canceling signal having phase almost equivalent to the inversed phase of the result of the addition, respectively. Thus, signals represented by the expressions 6-1 and 6-2, of which crosstalk components are removed, are output through the output terminals 1805*a* and 1805*b*, respectively.

In the sound image localization apparatus having the structure shown in FIG. 18(*b*), the output of a crosstalk canceling signal generating filter on either channel (for example, 1806*a*) is output to the output side of the other channel (the adder 1803*d* on the side having the output terminal 1805*b*). This structure is called feedforward.

As described above, the conventional sound image localization apparatus can localize a sound image over a wide range by localization of a virtual sound image and compensation of a crosstalk component. However, when trying to realize the foregoing sound image localization apparatus by a computer system using a CPU and a DSP, the following several problems arise.

The first problem is that because in this feedforward type sound image localization apparatus the crosstalk canceling signal is output to the output side of the whole apparatus, the canceling of crosstalk cannot be repeated, whereby the adverse effect of sound diffraction of low-frequency component becomes serious. Thus, it is difficult to improve low-frequency characteristics to make sound quality better.

The second problem is about a memory used for temporary storage in operational processing. The amount and performance of a memory in a computer system limit operational processing. The main constraints on memory are (A) constraint on the amount of memory for storage of sound signal data, (B) constraint on the amount of memory for storage of coefficients of a filter, and (C) constraint on accessing time of a memory.

As to (A) and (B), when the number of words showing the amount of memory is small, the number of taps indicating the order of a filter is limited to an insufficient size, resulting in a reduction in precision of operational processing.

Furthermore, when the amount of a high-speed internal memory included in a computer system is limited, if a relatively low-speed external memory (RAM) assists to secure a required precision of operational processing, the problem (C) arises. Because frequent memory accesses occur in operational processing realizing the above-described digital filter performing directional localization and crosstalk cancellation, a simple supplement of the external memory having a low accessing speed hardly solves the constraint on the amount of memory.

The third problem relates to a controller included in a computer system, such as DSP. The processing speed of the controller limits operational processing. When the processing speed is not sufficient, the order of a digital filter is limited, thereby reducing precision in operational processing.

The fourth problem is that it is difficult for the conventional sound image localization apparatus to deal with changes in setting of an acoustic system using it. For example, when loudspeakers are rearranged in the acoustic system in such a way as that the angle the loudspeakers attain changes, the conventional sound image localization apparatus modifies all the parameters of the filter FX. Thus, to adapt to changes in setting of the acoustic system, parameters for each setting are required to be held. The requirement of storage of parameters increases the amount of a memory.

As those problems indicate, the prior art sound image localization apparatus has a difficulty in improving low-frequency characteristics. Furthermore, when implemented in a computer system, the apparatus requires the large amount of memory and the high-speed of processing, thereby making it difficult to realize both precision of controlling sound image localization and a reduction in costs of the computer system.

SUMMARY OF THE INVENTION

It is an object of the present invention to provide a sound image localization apparatus achieving high sound quality by improving low-frequency characteristics.

It is another object of the present invention to provide a sound image localization, apparatus realizing sound image localization with good precision while limiting an increase in the circuit scale caused by requirement of the amount of memory.

It is still another object of the present invention to provide a sound image localization apparatus realizing sound image localization with good precision by additionally exploiting an external memory when the amount of a high-speed internal memory is limited.

It is yet another object of the present invention to provide a sound image localization apparatus realizing sound image localization with good precision by simplifying operational processing when the computer system does not include a high-performance DSP.

It is a further object of the present invention to provide a sound image localization apparatus flexibly coping with changes in setting of the acoustic system, without increasing the circuit scale.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, there is provided a sound image localization apparatus receiving a sound signal, performing signal processing to the sound signal, localizing a virtual sound image, and outputting a sound image localization signal, the apparatus comprising:

direction localizing means for localizing the direction of a virtual sound source position; and crosstalk canceling means for performing crosstalk cancellation by generating a crosstalk canceling signal, and outputting the crosstalk canceling signal toward the direction of where the sound signal is input.

As a result, the apparatus performs feedback processing by outputting a crosstalk canceling signal to the input side.

According to a second aspect of this invention, there is provided the sound image localization apparatus of the first aspect wherein the crosstalk canceling means perform crosstalk cancellation to a signal generated by directional localization of the direction localizing means.

As a result, the apparatus performs feedback processing by outputting a crosstalk canceling signal to the input side.

According to a third aspect of this invention, there is provided the sound image localization apparatus of the first aspect wherein the direction localizing means perform directional localization to a signal generated by crosstalk cancellation of the crosstalk canceling means.

As a result, the targets of crosstalk cancellation and directional localization are shared, and the apparatus performs feedback processing by outputting a crosstalk canceling signal to the input side.

According to a fourth aspect of this invention, there is provided the sound image localization apparatus of the third aspect wherein the crosstalk canceling means comprise first and second crosstalk canceling signal generating filters, and first and second adders, the first adder adding a first sound signal and a signal generated by the second crosstalk canceling signal generating filter, the second adder adding a second sound signal and a signal generated by the first crosstalk canceling signal generating filter;

the direction localizing means comprise first and second main-path filters, first and second crosstalk-path filters, and first and second adders, the first adder adding a signal processed by the first main-path filter and a signal processed by the second crosstalk-path filter, the second adder adding a signal processed by the second main-path filter and a signal processed by the first crosstalk-path filter.

As a result, a crosstalk canceling generating filter shares an input with a main-path filter and a crosstalk-path filter.

According to a fifth aspect of this invention, there is provided the sound image localization apparatus of the first aspect wherein the crosstalk canceling means use a comb filter to generate the crosstalk canceling signal.

As a result, the apparatus performs crosstalk cancellation using a signal generated by a crosstalk canceling signal generating filter including a comb filter of which the coefficients are the same.

According to a sixth aspect of this invention, there is provided the sound image localization apparatus of the fifth aspect wherein the apparatus further comprises a low-pass filter processing a signal input to or output from the crosstalk canceling means.

As a result, the apparatus performs crosstalk cancellation to a signal from which a high-frequency component is removed.

According to a seventh aspect of this invention, there is provided the sound image localization apparatus of the first aspect wherein the crosstalk canceling means hold the crosstalk canceling signal generated at a certain time, delay the crosstalk canceling signal held, hold the plurality of crosstalk canceling signals delayed, and multiply some of the plurality of crosstalk canceling signals held by a predetermined coefficient to generate the crosstalk canceling signal at a time following the certain time.

As a result, the apparatus performs crosstalk cancellation using a signal generated a crosstalk canceling signal generating filter including a circuit replacing a comb filter, of which the processing load is reduced.

According to an eighth aspect of this invention, there is provided the sound image localization apparatus of the seventh aspect wherein the apparatus further comprises a low-pass filter processing a signal input to or output from the crosstalk canceling means.

As a result, the apparatus performs crosstalk cancellation to a signal from which a high-frequency component is removed.

According to a ninth aspect of this invention, there is provided the sound image localization apparatus of the first aspect wherein the crosstalk canceling means further comprise a crosstalk canceling signal generating filter generating the crosstalk canceling signal, and a switch switching the crosstalk canceling signal generated by the crosstalk canceling signal generating filter to the output side of the crosstalk canceling signal generating filter in place of the input side of the crosstalk canceling signal generating filter.

As a result, the apparatus switches feedback processing and feedforward processing.

According to a tenth aspect of this invention, there is provided the sound image localization apparatus of the first aspect wherein the crosstalk canceling means further comprise a crosstalk canceling signal generating filter generating the crosstalk canceling signal, and a delaying unit delaying a signal input to or output from the crosstalk canceling signal generating filter by various times.

As a result, the apparatus performs crosstalk cancellation by changing the amount of an initial delay.

According to an eleventh aspect of this invention, there is provided the sound image localization apparatus of the first aspect wherein the apparatus processes an input sound signal to be localized in a first direction, and an input sound signal to be localized in a second direction;

the crosstalk canceling means comprising a first filter having a certain number of taps, a second filter different from the first filter, and a switch switching first and second modes; in the first mode the first filter functioning as a filter generating the crosstalk canceling signal, and in the second mode the second filter functioning as a filter generating the crosstalk canceling signal while the first filter functioning as a filter localizing the second direction.

As a result, a crosstalk canceling signal generating filter for localizing a sound image to be localized in a first direction, and a crosstalk canceling signal generating filter for localizing a sound image to be localized in a second direction, are switched.

DETAILED DESCRIPTION OF THE PREFERRED EMBODIMENTS

Embodiment 1

A sound image localization apparatus in accordance with a first embodiment of this invention improves low-frequency characteristics by feedback crosstalk cancellation.

Figure 1:
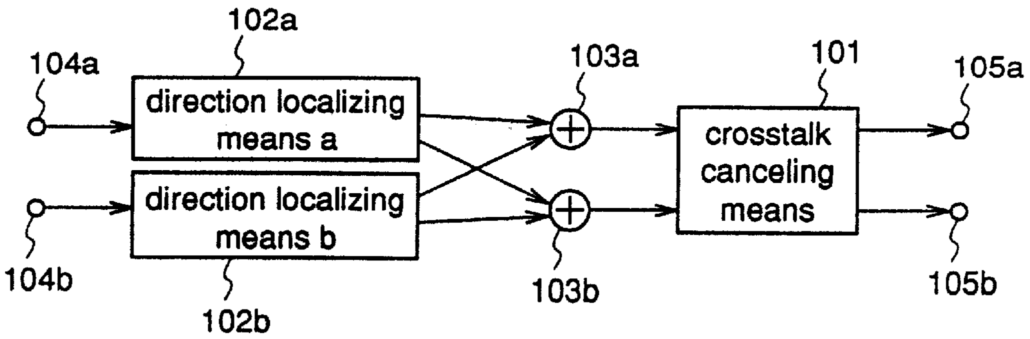
FIGS. 1(*a*) and 1(*b*) are block diagrams showing structures of a sound image localization apparatus in accordance with a first embodiment of this invention.
Figure 1:
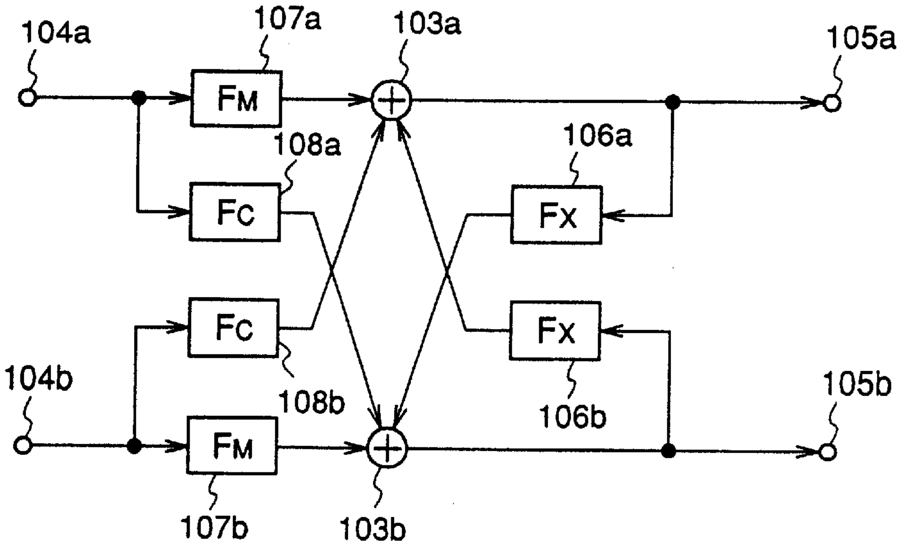

FIG. 1(*a*) is a block diagram illustrating a structure of the sound image localization apparatus of the first embodiment. As shown in the figure, the sound image localization apparatus comprises a crosstalk canceling means 101, direction localizing means 102*a* and 102*b*, and adders 103*a* and 103*b*. The apparatus receives input sound signals through input terminals 104*a* and 104*b*, and outputs signals resulting from signal processing through output terminals 105*a* and 105*b*.

The crosstalk canceling means 101 removes a crosstalk component from an input signal. The direction localizing means 102*a* and 102*b* process the input sound signals input through the input terminals 104*a* and 104*b* to produce signals indicating the directions of positions of sound images. The adders 103*a* and 103*b* add input signals.

The operational processing of the sound image localization apparatus will be explained. The other solution to xL and xR from the equations 4-1 and 4-2 is possible, rather than the expressions 6-1 and 6-2 described in the BACKGROUND OF THE INVENTION section.

$$xL=FM\cdot uL+FC\cdot uR+FX\cdot xR \quad (8\text{-}1)$$

and $$xR=FC\cdot uL+FM\cdot uR+FX\cdot xL \quad (8\text{-}2)$$

are obtained. In the equations 8-1 and 8-2, the first and second terms on the right side indicate the directions of sound images, that is, they localize the directions. The third term on the right side cancels a crosstalk component.

The sound image localization apparatus of the first embodiment performs signal processing according to the equations 8-1 and 8-2.

FIG. 1(*b*) is a diagram showing a detailed structure of the sound image localization apparatus. The crosstalk canceling means 101 in FIG. 1(*a*) comprises crosstalk canceling signal generating filters 106*a* and 106*b*, and adders 103*a* and 103*b*. The direction localizing means 102*a* and 102*b* in FIG. 1(*a*) comprise main-path filters 107*a* and 107*b*, and crosstalk-path filters 108*a* and 108*b*, respectively. The adders 103*a* and 103*b* are the same as those in FIG. 1(*a*), and also part of the crosstalk canceling means 101.

The sound image localization apparatus shown in FIG. 1(*b*) generates outputs xL and xR according to the equations 8-1 and 8-2. With the different structure from that shown in FIG. 18(*b*), the sound image localization apparatus is called a feedback type, because a crosstalk canceling signal generating filter (for instance, 106*a*) on either channel outputs a signal to the input side on the other channel (the adder 103*b*). A description will be given of how the sound image localization apparatus operates.

Left and right input sound signals are input through the input terminals 104*a* and 104*b*, respectively. The first input sound signal input through the input terminal 104*a* is input to the main-path filter 107*a* and the crosstalk-path filter 108*a*. The main-path filter 107*a* multiplies the input signal by the coefficient represented by the equation 7-1, and outputs the result to the adder 103*a*. The crosstalk-path filter 108*a* multiplies the input signal by the coefficient represented by the equation 7-2, and outputs the result to the adder 103*b*. In a similar way, the second input sound signal input through the input terminal 104*b* is input to the main-path filter 107*b* and the crosstalk-path filter 108*b*, where the signals are multiplied by coefficients represented by the equations 7-1 and 7-2, and the results are output to the adders 103*b* and 103*a*, respectively.

The adders 103*a* and 103*b* each add the input signals. The adder 103*a* outputs a result of the addition to the crosstalk canceling signal generating filter 106*a*. The crosstalk canceling signal generating filter 106*a* multiplies the input signal by the coefficient represented by the equation 7-3 to generate a crosstalk canceling signal, and outputs it to the adder 103*b*. Similarly, the adder 103*b* outputs a result of the addition to the crosstalk canceling signal generating filter 106*b*. The crosstalk canceling signal generating filter 106*b* multiplies the input signal by the coefficient represented by the equation 7-3 to generate a crosstalk canceling signal, and outputs it to the adder 103*a*.

The adders 103*a* and 103*b* add the outputs of the direction localizing filter, and further add a result of the addition to the crosstalk canceling signal having a sign opposite to the result of the addition, to remove a crosstalk component. Hence, signals represented by the equations 8-1 and 8-2 are output through the output terminals 105*a* and 105*b*.

As hereinbefore described, in the sound image localization apparatus in accordance with the first embodiment, as shown in FIG. 1(*b*), the crosstalk canceling signals generated by the crosstalk canceling signal generating filters 106*a* and 106*b* are output nearer the input end of the apparatus than the crosstalk canceling signal generating filters (the adders 103*a* and 103*b*), which makes the apparatus a feedback type. Thereby, multiple cancellation, in which the generation of a crosstalk canceling signal and the crosstalk cancellation using the generated signal are repeated, becomes possible. Compared with the prior art feedforward type apparatus shown in FIGS. 18(*a*) and 18(*b*), the adverse effect of sound diffraction of a low-frequency component of a sound signal is reduced, thereby solving the first problem of the prior art and improving low-frequency characteristics.

Embodiment 2

A sound image localization apparatus in accordance with a second embodiment of this invention reduces the necessary amount of memory by subjecting a signal to directional localization after performing crosstalk cancellation to the signal.

Figure 2:
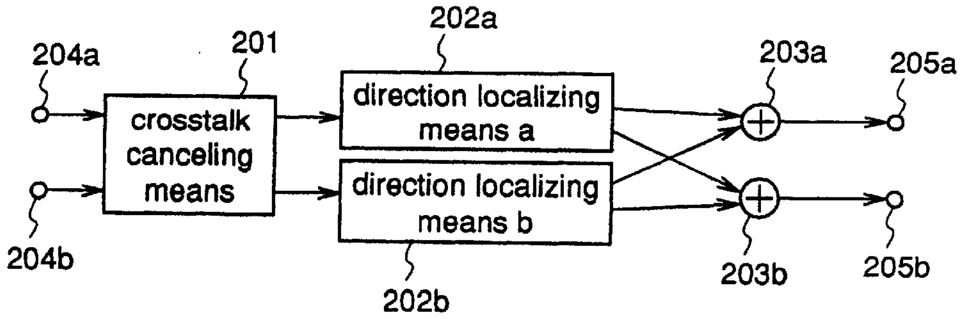
FIGS. 2(*a*) and 2(*b*) are block diagrams showing structures of a sound image localization apparatus in accordance with a second embodiment of this invention.
Figure 2:
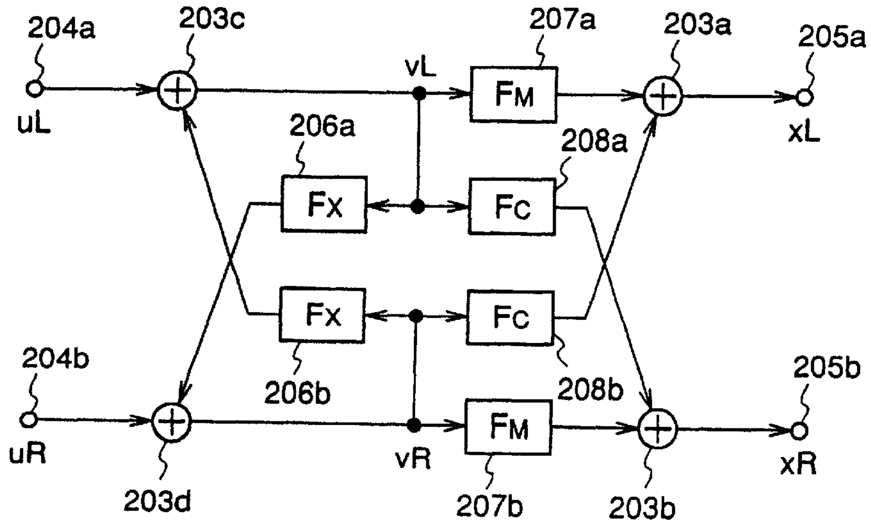

FIG. 2(*a*) is a block diagram showing a structure of the sound image localization apparatus of the second embodiment. As shown in the figure, the sound image localization apparatus comprises a crosstalk canceling means 201, and direction localizing means 202*a* and 202*b*, adders 203*a* and 203*b*. The apparatus receives input sound signals through input terminals 204*a* and 204*b*, subjects the input signals to signal processing, and outputs the resulting signals through output terminals 205*a* and 205*b*.

The crosstalk canceling means 201 removes crosstalk components from the input signals input through the input terminals 204*a* and 204*b*. The direction localizing means 202*a* and 202*b* process input sound signals to produce signals indicating the directions of sound images. The adders 203*a* and 203*b* add input signals.

The operational processing of the sound image localization apparatus will be explained. Initially, in addition to the equations 1-1 to 8-2 shown in the BACKGROUND OF THE INVENTION and Embodiment 1 sections, vL and vR are defined by $$xL=FM\cdot vL+FC\cdot vR \tag{9-1}$$

and $$xR=FC\cdot vL+FM\cdot vR \tag{9-2}$$

The equation 9-1 is substituted to the equation 8-1, and 9-2 is substituted to 8-2, and then $$FM\cdot vL+FC\cdot vR=FM\cdot uL+FC\cdot uR+FX\cdot(FC\cdot vL+FM\cdot vR) \tag{10-1}$$

and $$FC\cdot vL+FM\cdot vR=FC\cdot uL+FM\cdot uR+FX\cdot(FM\cdot vL+FC\cdot vR) \tag{10-2}$$

are obtained. From 10-1 and 10-2, FM and FC are eliminated, and then $$vL=uL+FX\cdot vR \tag{11-1}$$

and $$vR=uR+FX\cdot vL \tag{11-2}$$

are obtained.

The equations 11-1 and 11-2 mean that a crosstalk canceling means is required to be set up on the input side. The equations 9-1 and 9-2 mean that direction localizing means are required to be set up on the output side. Accordingly, the sound image localization apparatus of the second embodiment, as shown in FIG. 2(*a*), includes a crosstalk canceling means 201 on the input side, and direction localizing means 202*a* and 202*b* on the output side.

FIG. 2(*b*) is a diagram showing a detailed structure of a first example of the sound image localization apparatus of the second embodiment. The crosstalk canceling means 201 shown in FIG. 2(*a*) comprises crosstalk canceling signal generating filters 206*a* and 206*b*, and adders 203*c* and 203*d* in FIG. 2(*b*). The direction localizing means 202*a* and 202*b* shown in FIG. 2(*b*) comprise main-path filters 207*a* and 207*b*, and crosstalk-path filters 208*a* and 208*b* in FIG. 2(*b*), respectively. An explanation will be given of the operation of the first example of the sound image localization apparatus.

Left and right input sound signals uL and uR are input through input terminals 204*a* and 204*b*. In FIG. 2(*b*), the input sound signal uL input through the input terminal 204*a* is input to the adder 203*c*. The second input sound signal uR input through the input terminal 204*b* is input to the adder 203*d*. Immediately after the sound image localization apparatus starts processing, the crosstalk canceling signal generating filters 206*a* and 206*b* don't generate any signals to be output to the adders 203*c* and 203*d*, so the adders 203*c* and 203*d* output input signals uL and uR as they are. The signals uL and uR are input to the crosstalk canceling signal generating filters 206*a* and 206*b* as signals vL and vR, respectively.

The crosstalk canceling signal generating filter 206*a* multiplies the input signal by the coefficient having a negative sign represented by the equation 7-3 to produce a crosstalk canceling signal, and outputs it to the adder 203*d*. The crosstalk canceling signal generating filter 206*b* performs a similar processing to produce a crosstalk canceling signal, and outputs it to the adder 203*c*.

The adder 203*c* adds the input sound signal uL and the crosstalk canceling signal to perform crosstalk cancellation, generating the signal vL represented by the equation 11-1. The generated signal vL is input to the main-path filter 207*a* and the crosstalk-path filter 208*a*. In a similar manner, the adder 203*d* generates the signal vR represented by 11-2, which is input to the main-path filter 207*b* and the crosstalk-path filter 208*b*.

The main-path filter 207*a* multiplies the input signal by the coefficient represented by the equation 7-1, and outputs the result to the adder 203*a*. The crosstalk-path filter 208*a* multiplies the input signal by the coefficient represented by the equation 7-2, and outputs the result to the adder 203*b*. The output of the main-path filter 207*a* is represented by the first term on the right side of the equation 9-1. The output of the crosstalk-path filter 208*a* is represented by the second term on the right side of the equation 9-2.

Similarly, the adder 203*d* adds the crosstalk canceling signal to the input sound signal uR to perform crosstalk cancellation. The resulting signal vR is input to the main-path filter 207*b* and the crosstalk-path filter 208*b*, where the signal is multiplied by the coefficients represented by the equations 7-1 and 7-2, respectively. The outputs of the main-path filter 207*b* and the crosstalk-path filter 208*b* are input to the adders 203*b* and 203*a*, respectively. The output of the main-path filter 207*b* is represented by the first term on the right side of the equation 9-2. The output of the crosstalk-path filter 208*a* is represented by the second term on the right side of the equation 9-1.

The adders 203*a* and 203*b* each add input signals, and output results of the addition through the output terminals 205*a* and 205*b*, respectively. Thus, the sound image localization apparatus in accordance with the second embodiment outputs signals xL and xR processed by directional localization, represented by the equations 9-1 and 9-2.

As described above, in the sound image localization apparatus in accordance with the second embodiment, because signals are subjected to crosstalk cancellation prior to directional localization, as shown in FIG. 2(*b*), the inputs of the crosstalk canceling signal generating filter (FX) and the direction localizing filter (FM and FC) are the same signal, vL or vR. Thus, for filtering, just those two signals are required to hold. Compared with the conventional sound image localization apparatus shown in FIGS. 18(*a*) and 18(*b*), required to hold four kinds of signals, the amount of memory required to hold sound signals, described as the second problem in the BACKGROUND OF THE INVENTION section, can be reduced to a small size.

To explain the required amount of memory in the apparatus of the second embodiment, each structure of filters for crosstalk cancellation and directional localization will be shown.

Figure 3:
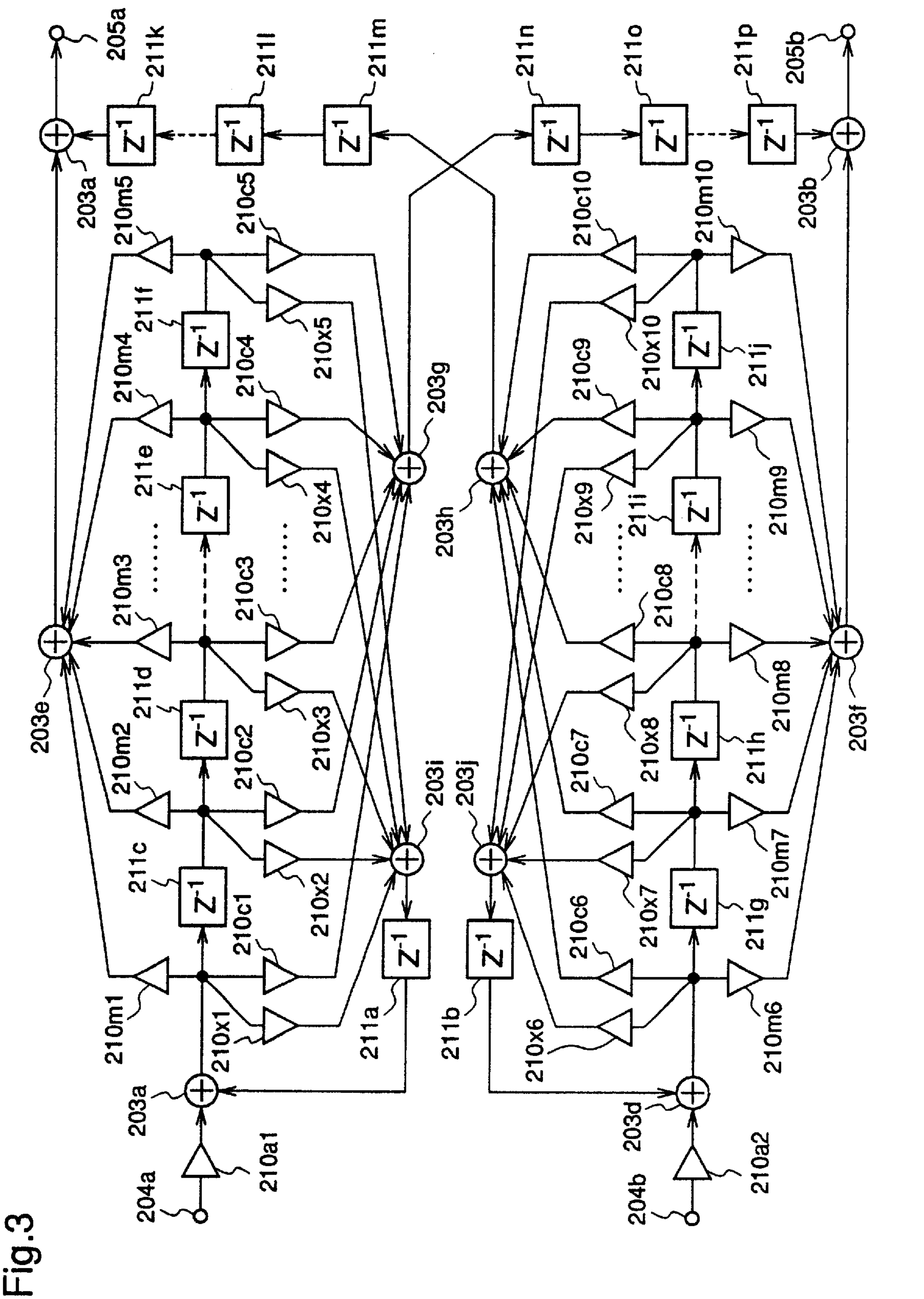
FIG. 3 is a diagram showing an example of a structure of a filter included in the sound image localization apparatus of the second embodiment.
Figure 4:
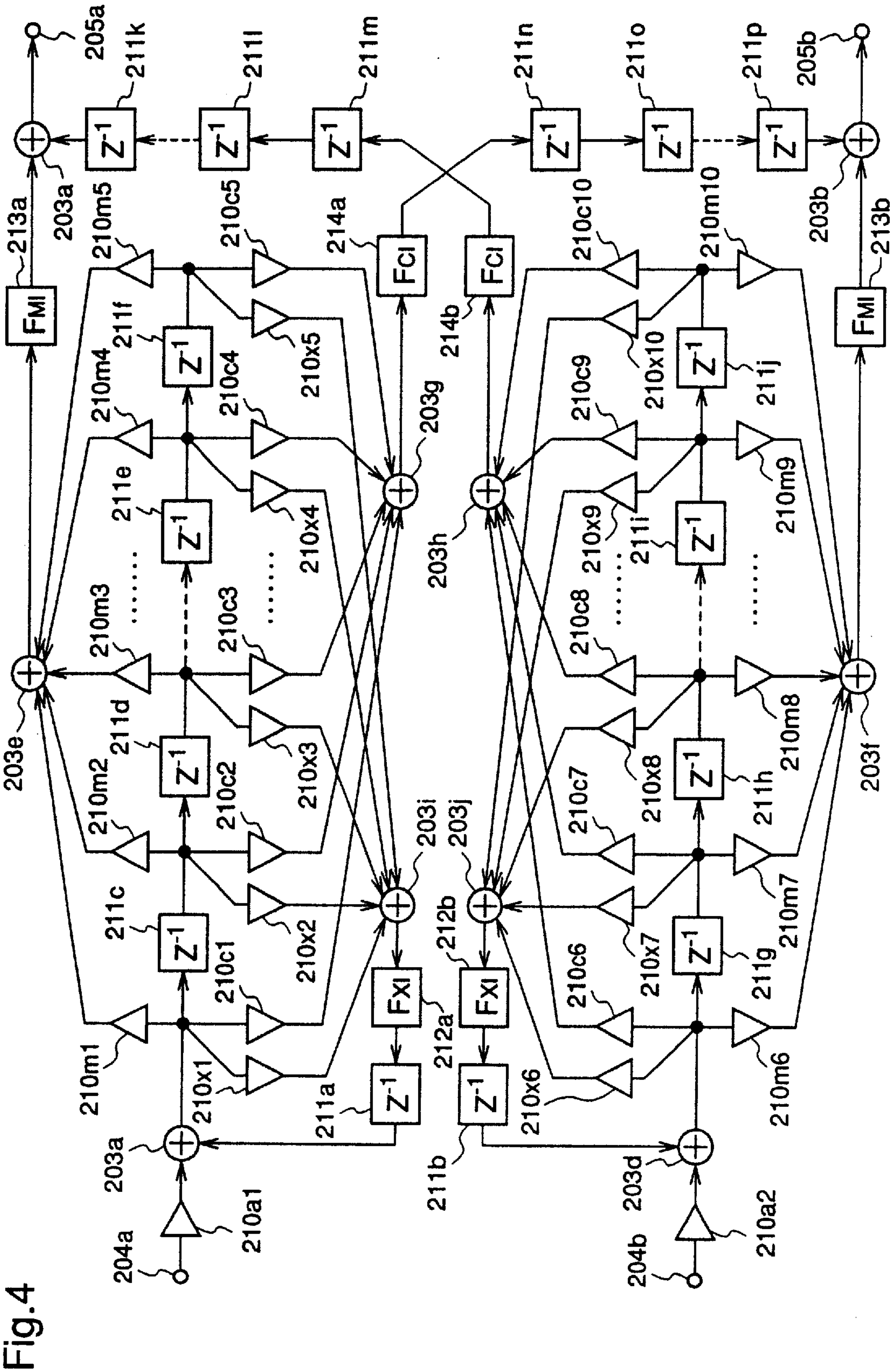
FIG. 4 is a diagram showing an example of a structure of a filter included in the sound image localization apparatus of the second embodiment.

There are two sorts of filters, FIR (Finite Impulse Response) accumulating input signals and IIR (Infinite Impulse Response) accumulating output signals as well as input signals. Either of the two kinds of filters can realize the sound image localization apparatus of the second embodiment. FIG. 3 is a diagram showing the first example of the apparatus in which the crosstalk canceling signal generating filters 206*a* and 206*b*, and the direction localizing filters 207*a*, 207*b*, 208*a*, and 208*b* are FIR filters. FIG. 4 shows another example in which each filter shown in FIG. 2(*b*) is the concatenation of an FIR filter and an IIR filter.

In FIG. 3, the crosstalk canceling signal generating filter 206*a* included in the first example (FIG. 2(*b*)) of the sound image localization apparatus, comprises delaying units 211*a* and 211*c* to 211*f*, multiplier 210*x*1 to 210*x*5, and an adder 203*i*. The crosstalk canceling signal generating filter 206*b* comprises delaying units 211*b* and 211*g* to 211*j*, multipliers 210*x*6 to 210*x*10, and an adder 203*j*. The parts in FIG. 3 represented by the dashed lines, such as the multipliers 210*x*1 to 210*x*5 and the delaying units 211*c* to 211*f*, show that the number of multipliers or delaying units is variable.

The main-path filter 207*a* comprises delaying units 211*c* to 211*f*, multipliers 210*m*1 to 210*m*5, and an adder 203*e*. The main-path filter 207*b* comprises delaying units 211*g* to 211*j*, multipliers 210*m*6 to 210*m*10, and an adder 203*f*. The crosstalk-path filter 208*a* comprises delaying units 211*c* to 211*f* and 211*n* to 211*p*, multipliers 210*c*1 to 210*c*5, and an adder 203*g*. The crosstalk-path filter 208*b* comprises delaying units 211*g* to 211*j* and 211*k* to 211*m*, multipliers 210*c*6 to 210*c*10, and an adder 203*h*.

Multipliers 210*a*1 and 210*a*2 function as attenuators to prevent overflow in executing fixed point calculation. Delaying units 211*k* to 211*p* are employed to produce the time difference between both cars.

As the filters in FIG. 3 include the delaying units 211*c* to 211*j*, the crosstalk canceling signal generating filer and the direction localizing filter receive the same input signals, as signals vL or vR shown in FIG. 2(*b*). Hence, compared with the case where the input of each filter is held, it is possible to reduce the amount of memory required to hold signals.

FIG. 4 shows the example using IIR filters. In this example, a crosstalk canceling signal generating filter comprises IIR filter FXIs 212*a* and 212*b*. A main-path filter comprises IIR filter FMIs 213*a* and 213*b*. A crosstalk-path filter comprises IIR filter FCIs 214*a* and 214*b*. Those IIR filters are concatenated with the FIR filters shown in FIG. 3.

The portions of the main-path filter, the crosstalk-path filter, and the crosstalk canceling signal generating filter, constituted by FIR filters, are represented by FMF, FCF, and FXF, respectively. The FM, FC, and FX shown in the equations 7-1 to 7-3 are represented by $$FM=FMF\cdot FMI \tag{12-1}$$

$$FC=FCF\cdot FCI \tag{12-2}$$

and $$FX=FXF\cdot FXI \tag{12-3}$$

Also in this case, similar to the structure shown in FIG. 3, the FIR filter portions share an input, thereby making it possible to reduce the required amount of memory. It should be noted that the reduction is not as much as that in the case where only the FIR filters are employed.

Figure 5:
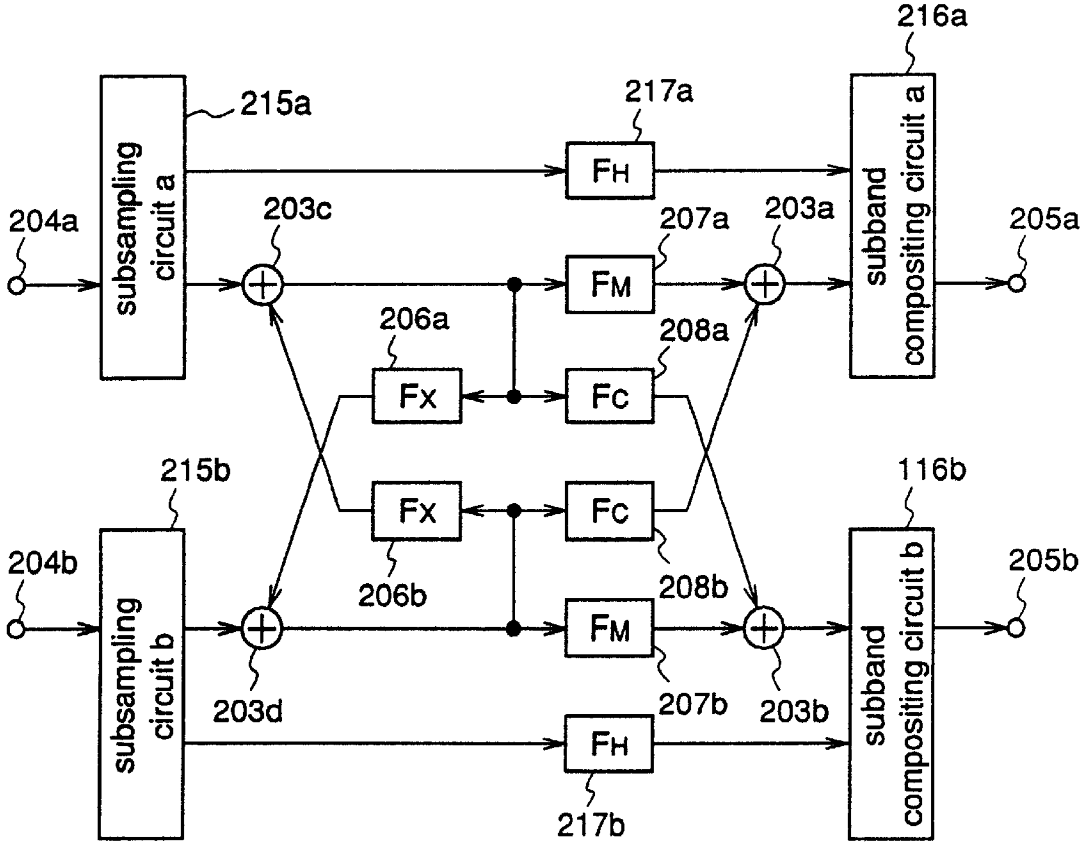
FIG. 5 is a block diagram showing a structure of an application example of the sound image localization apparatus of the second embodiment.

FIG. 5 is a diagram showing a detailed structure of a second example of a sound image localization apparatus, shown in FIG. 2(*a*), in accordance with the second embodiment. As shown in the figure, the second example of the sound image localization apparatus comprises adders 203*a* to 203*d*, crosstalk canceling signal generating filters 206*a* and 206*b*, main-path filters 207*a* and 207*b*, crosstalk-path filters 208*a* and 208*b*, high-frequency main-path filters 217*a* and 217*b*, subsampling circuits 215*a* and 215*b*, and band compositing circuits 216*a* and 216*b*. As in the first example shown in FIG. 2(*b*), input sound signals are input through the input terminals 204*a* and 204*b*, and subjected to signal processing, and the resulting signals are output through the output terminals 205*a* and 205*b*.

The subsampling circuits 215*a* and 215*b* subject input signals to prescribed subsampling to produce a low-frequency component and a high-frequency component. The band compositing circuits 216*a* and 216*b* subject input signals to prescribed composition to produce composite signals. The high-frequency main-path filters 217*a* and 217*b* operate in a similar way to the main-path filters 207*a* and 207*b*. The adders 203*a* to 203*d*, the crosstalk canceling signal generating filters 206*a* and 206*b*, main-path filters 207*a* and 207*b*, and the crosstalk-path filters 208*a* and 208*b* are similar to those in the first example.

The operation of the second example of the sound image localization apparatus of the second embodiment will be described.

Left and right input sound signals are input through the input terminals 204*a* and 204*b*. The first input sound signal input through the input terminal 204*a* is input to the subsampling circuit 215*a*. The subsampling circuit 215*a* subsamples the first input sound signal to a high-frequency component and a low-frequency component, and outputs the high-frequency component to the high-frequency main-path filter 217*a*, and the low-frequency component to the adder 203*c*. The subsampling circuit 215*b* operates in a similar way.

The high-frequency main-path filters 217*a* and 217*b* multiply the input high-frequency components by the coefficient represented by the equation 7-1, and output the resulting signals to the band compositing circuits 216*a* and 216*b*, respectively.

The low-frequency component of the input sound signal is subjected to crosstalk cancellation and directional localization in a similar manner to the first example, and the resulting signals are input to the band compositing circuits 215*a* and 215*b*, respectively. The band compositing circuits 215*a* and 215*b* composite a signal resulting from processing the high-frequency component with the high-frequency filter, and a signal resulting from processing the low-frequency component by directional localization after crosstalk cancellation, and output the composite signals through the output terminals 205*a* and 205*b*, respectively.

As is clear from the above, a second example of the sound image localization apparatus subjects only the low-frequency component of the input signal to crosstalk cancellation. In general, the high-frequency component of an input signal is seriously affected by a slight shift of the head of a listener and differences among individuals, so that the benefit of crosstalk cancellation is little for the high-frequency component. Therefore, a second example of the sound image localization apparatus processes the high-frequency component only with the main-path filter. Thus, because the target of crosstalk cancellation is only the low-frequency component, the number of sampling frequency can be reduced, thereby making it possible to make the sizes of filter circuits in FIGS. 3 and 4 smaller without reducing the precision of sound image localization.

As hereinbefore pointed out, the sound image localization apparatus in accordance with the second embodiment, as shown in FIG. 2(*a*), comprises a crosstalk canceling means 201 on the input side, and direction localizing means 202*a* and 202*b* on the output side. Thereby, each filter included in the crosstalk canceling means 201 and the direction localizing means 202*a* and 202*b* shares an input signal by using delaying units as shown in FIGS. 3 and 4. As a result, the amount of memory required to hold a sound signal is reduced while sound image localization can be satisfactory.

Embodiment 3

A sound image localization apparatus in accordance with a third embodiment of this invention employs a comb filter.

Figure 6:
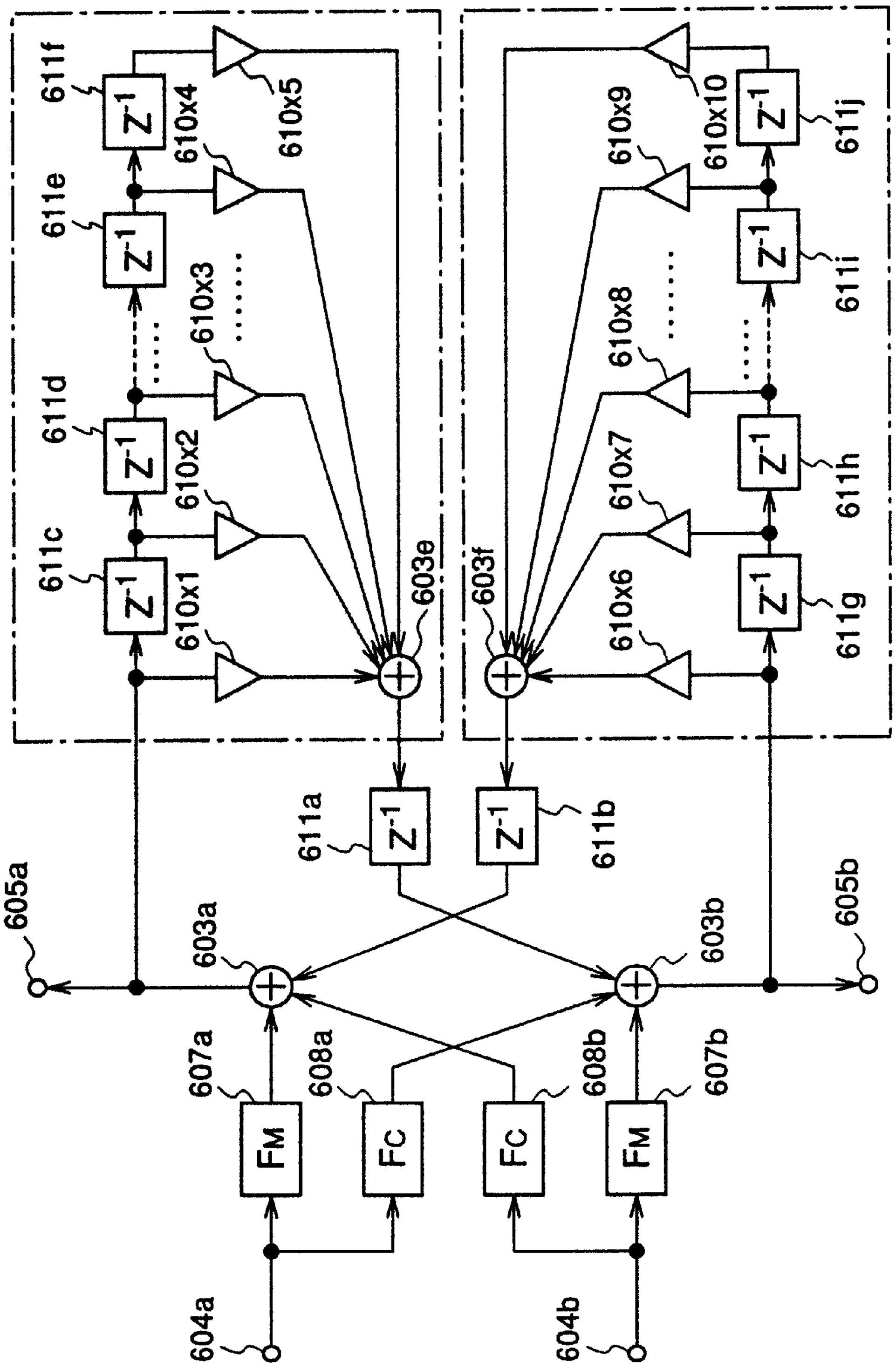
FIG. 6 is a block diagram showing a structure of a sound image localization apparatus in accordance with a third embodiment of this invention.

FIG. 6 is a block diagram showing a structure of a first example of the sound image localization apparatus of the third embodiment. The outline of the structure of the sound image localization apparatus is similar to the structure of the feedback type apparatus of the first embodiment shown in FIGS. 1(*a*) and 1(*b*). As shown in FIG. 6, the sound image localization apparatus comprises adders 603*a*, 603*b*, 603*e*, and 603*f*, main-path filters 607*a* and 607*b*, crosstalk-path filters 608*a* and 608*b*, delaying units 611*a* to 611*j*, and multipliers 610*x*1 to 610*x*10. Input sound signals are input through input terminals 604*a* and 604*b*, and subjected to signal processing, and the resulting signals are output through output terminals 605*a* and 605*b*. As in FIG. 3 and so on, dashed lines on rows of the delaying units and the multipliers represent an arbitrary number of the delaying units and the multipliers in FIG. 6.

In FIG. 6, the crosstalk canceling signal generating filter 106*a* shown in FIG. 1(*b*) comprises the delaying units 611*a*, 611*c* to 611*f*, the multipliers 610*x*1 to 610*x*5, and the adder 603*e*. The crosstalk canceling signal generating filter 106*b* shown in FIG. 1(*b*) comprises the delaying units 611*b*, 611*g* to 611*j*, the multipliers 610*x*6 to 610*x*10, and the adder 603*f*. All the coefficients of the multipliers 610*x*1 to 610*x*10 are possible to be the same, which makes the filter a comb type. Therefore, when using a comb filter, it is possible to reduce the amount of memory required to hold the coefficient, described in the BACKGROUND IN THE INVENTION section, as the second problem (B).

The operation of the sound image localization apparatus of the third embodiment is similar to that of the feedback type sound image localization apparatus of the first embodiment.

Figure 8:
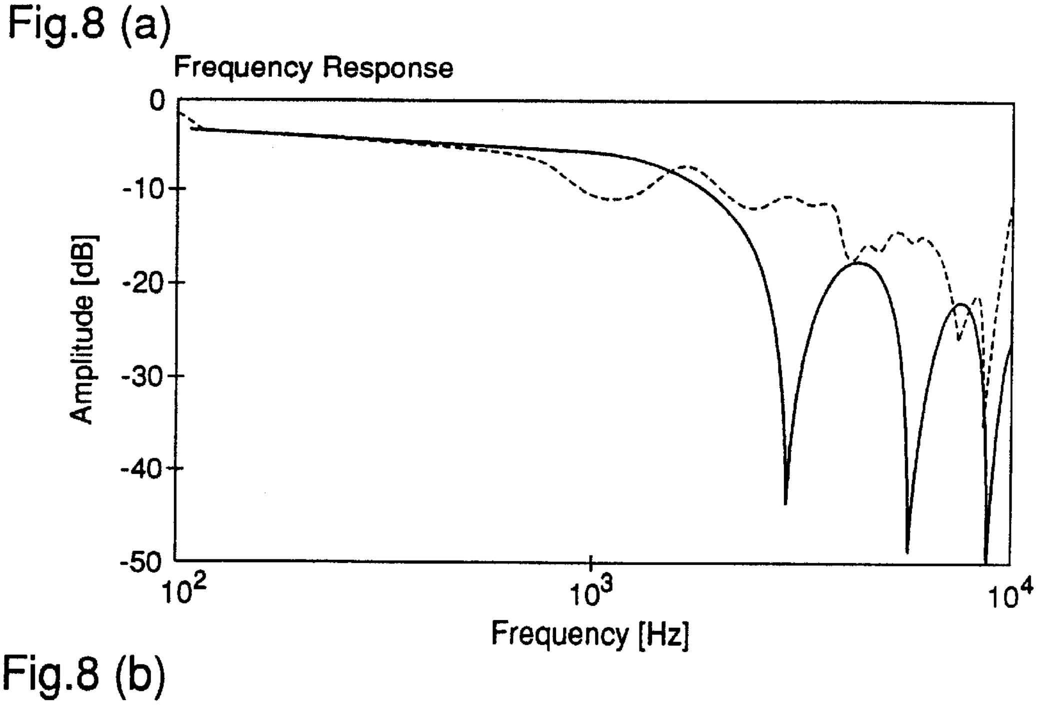
FIGS. 8(*a*) and 8(*b*) are graphs showing frequency characteristics of a filter used in the third embodiment to explain how the filter works.
Figure 8:
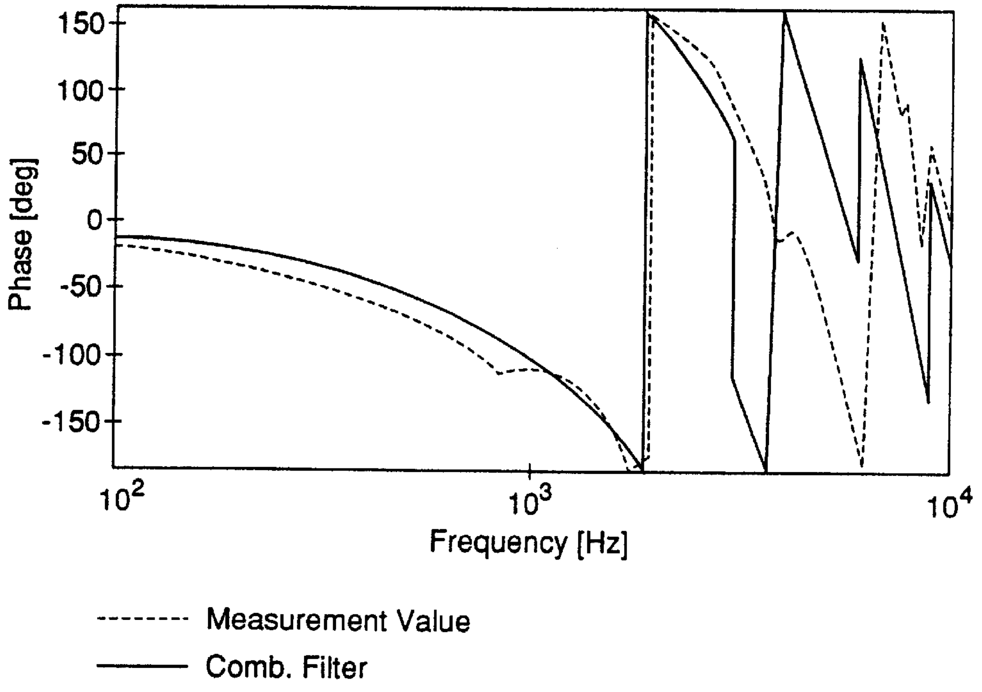

FIGS. 8(*a*) and 8(*b*) are graphs for explaining frequency characteristics of a filter. FIG. 8(*a*) shows amplitude characteristics. FIG. 8(*b*) indicates phase characteristics. In either figure, a solid line represents characteristics of the comb filter used in the third embodiment, and a dashed line represent characteristics obtained from the ratio of head related transfer functions. In general, a comb filter has a linear phase type low-pass characteristics. As is apparent from the figure, both the characteristics are similar to each other in a low-frequency range of the amplitude and phase characteristics. As described in the second embodiment, cancellation is particularly effective in a low-frequency range of a sound signal. Because the characteristics of the comb filter is approximate to that obtained from the head related transfer function in the low-frequency range, the comb filter operates well for the low-frequency range. For a high-frequency range in which the two characteristics differ, crosstalk cancellation is hardly effective, so the influence of differences between the two characteristics is little.

Figure 7:
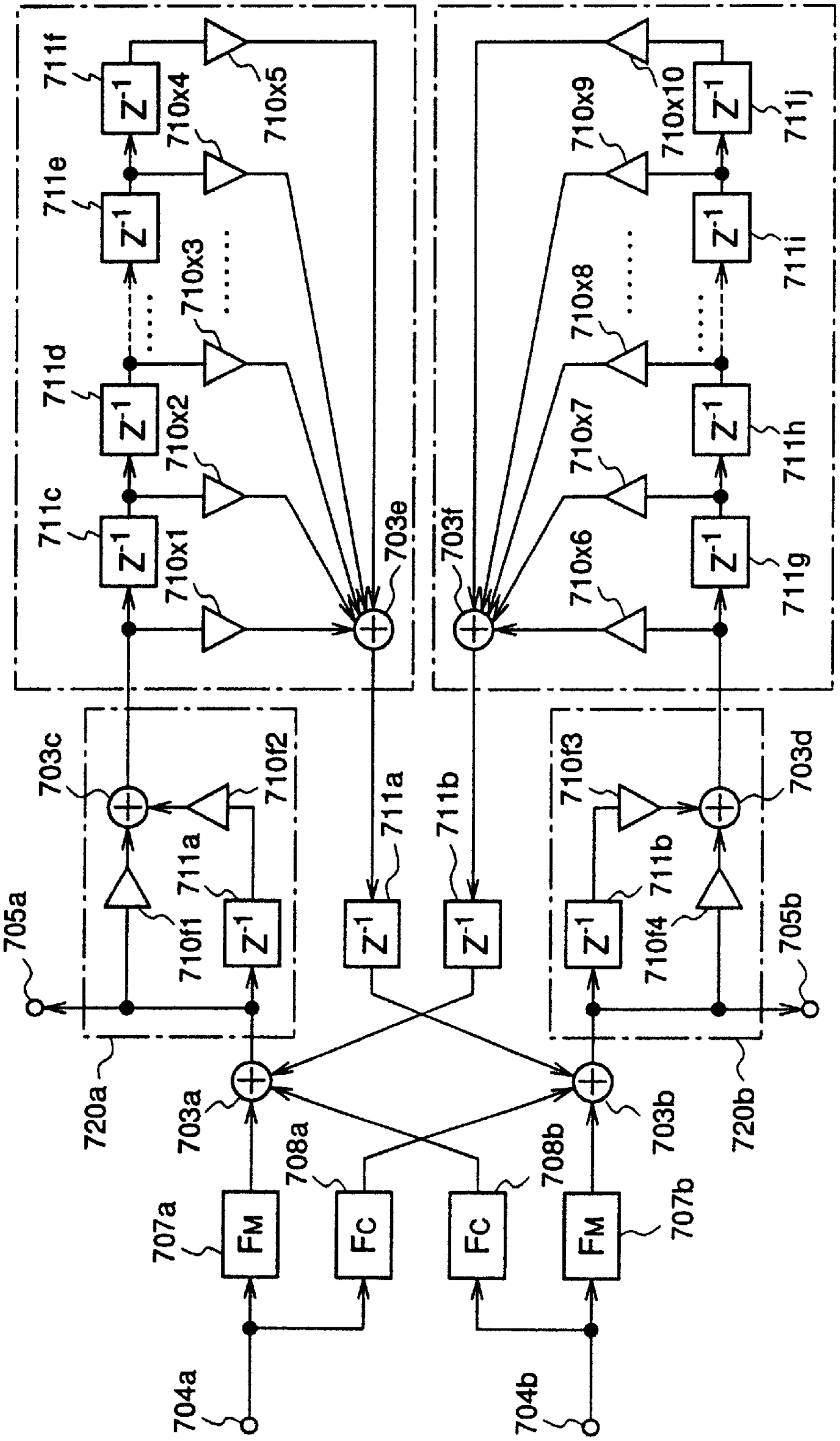
FIG. 7 is a block diagram showing a structure of an application example of the sound image localization apparatus of the third embodiment.

FIG. 7 is a block diagram showing a structure of a second example of the sound image localization apparatus of the third embodiment. As shown in FIG. 7, this example includes a first example of the sound image localization apparatus, and further comprises low-pass filters 720*a* and 720*b*. The low-pass filter 720*a* comprises an adder 703*c*, multipliers 710*f*1 and 710*f*2, and a delaying unit 711*a*. The low-pass filter 720*b* comprises an adder 703*d*, multipliers 710*f*3 and 710*f*4, and a delaying unit 711*b*.

As to the operation of the sound image localization apparatus, the high-frequency components of signals input to the crosstalk canceling signal generating filters 106*a* and 106*b* shown in FIG. 1(*b*) are removed, and the other operation is similar to that of the first example. As hereinbefore pointed out, in generating a crosstalk canceling signal, the high-frequency component of a sound signal is not necessarily taken into consideration. In this example, the high-frequency component is not the target of processing, thereby making it possible to improve the precision of sound localization better than the first example. Note that the scale of the circuit of the second example becomes slightly larger than that of the first example by the low-pass filter.

Although in the second example the low-pass filter is disposed in front of the crosstalk canceling signal generating filter, i.e., on the input side, the low-pass filter can be disposed at the rear of the crosstalk canceling signal generating filter, i.e., on the output side, thereby making possible the same effect.

Figure 9:
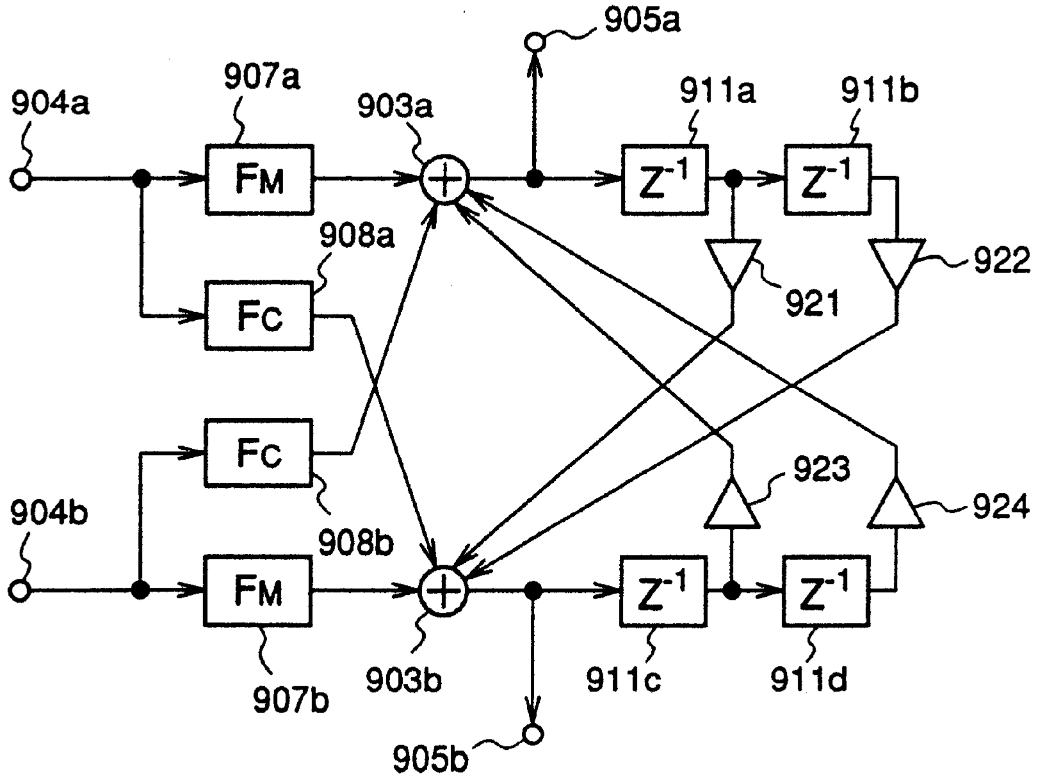
FIG. 9 is a block diagram showing a structure of an application example of the sound image localization apparatus of the third embodiment.

FIG. 9 is a diagram showing a structure of a third example of the sound image localization apparatus of the second embodiment. As shown in the figure, this example employs a comb filter, similar to that in the first example, but having FIRs of which the number of taps is small. In the structure shown in FIG. 9, the number of taps is two, and all the coefficients can be set to, for instance, −0.46. In this case, the filter becomes a filter having linear phased low-pass characteristics. This sound image localization apparatus operates in a similar way to the first example.

Figure 19:
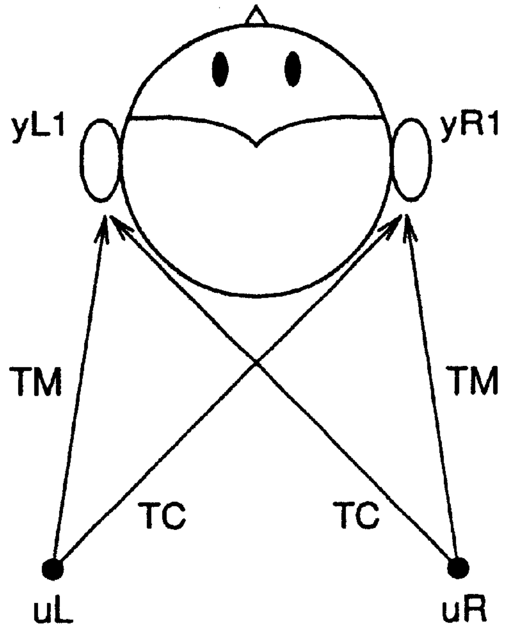
FIGS. 19(*a*) and 19(*b*) are diagrams for explaining sound image localization.
Figure 19:
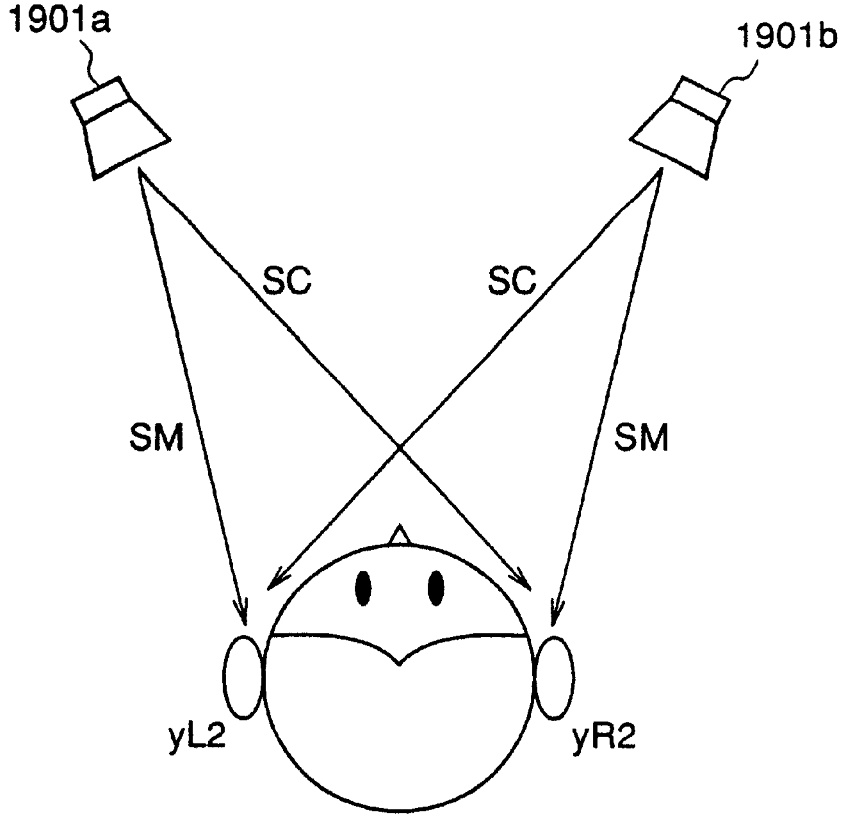
Figure 3:
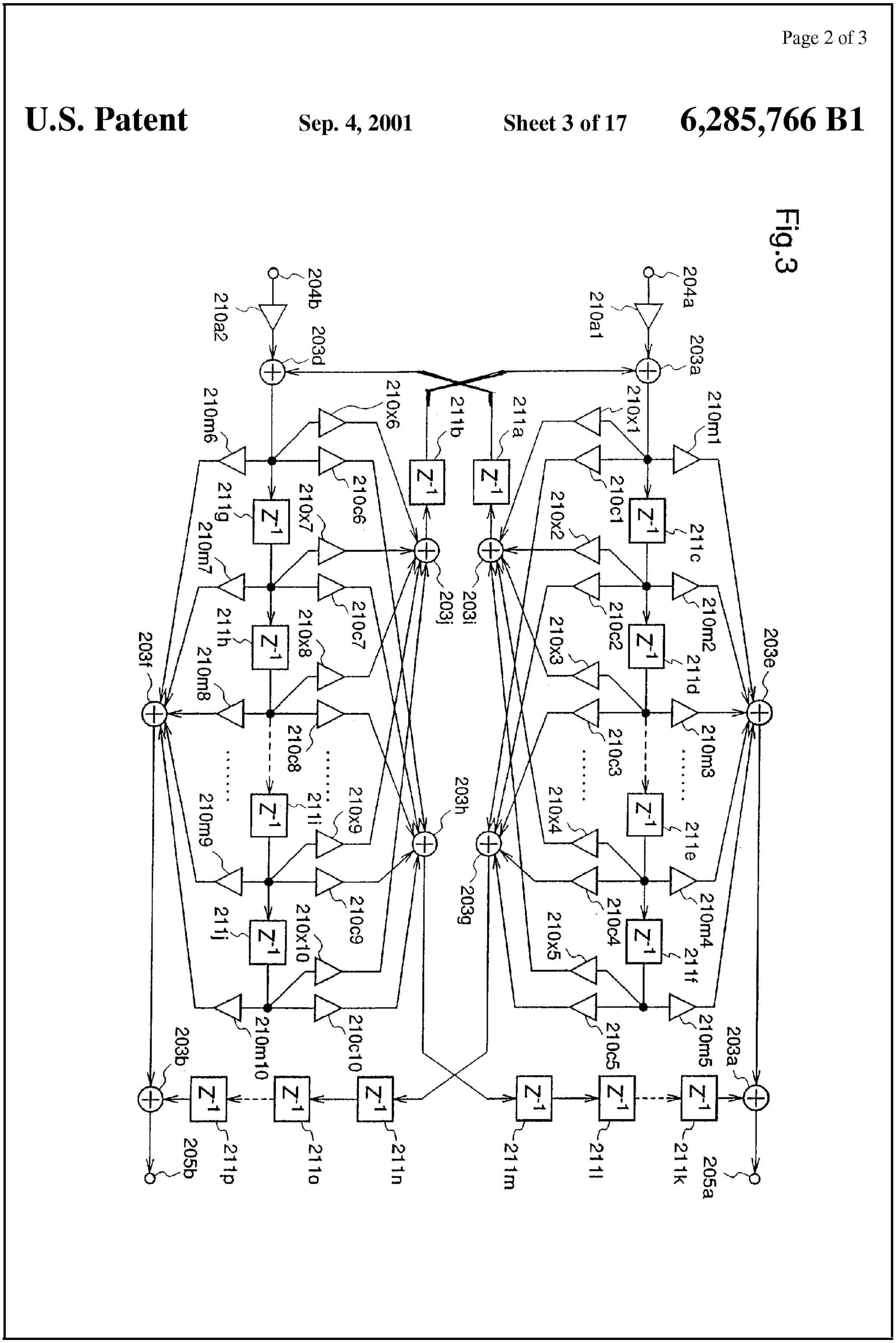
Figure 4:
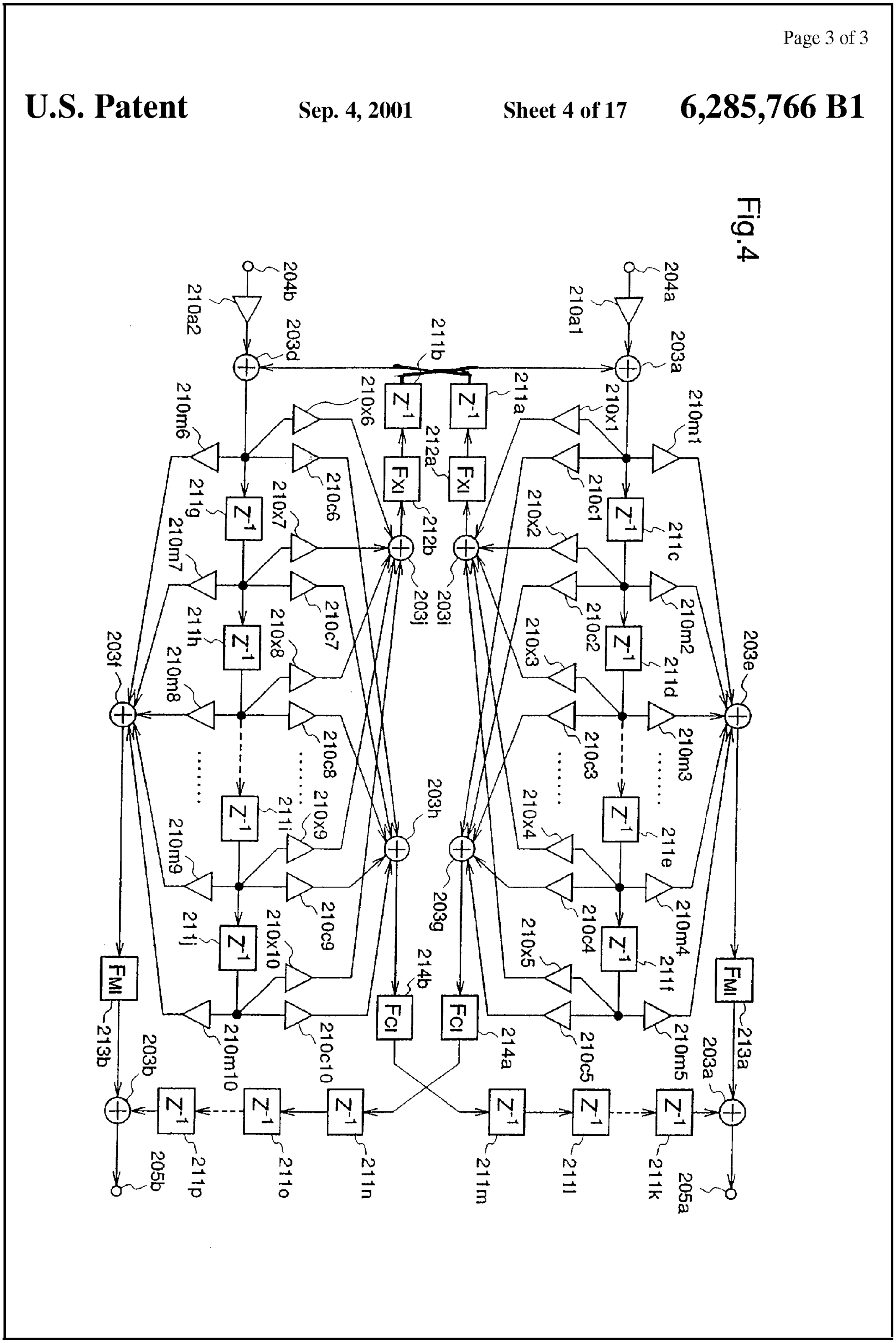

In an acoustic system using the sound image localization apparatus, when the distance between two loudspeakers is set to be short, for example, the angle the loudspeakers attain is 10 to 20 degrees, the ratio of head related transfer functions shown in FIG. 19(*b*), i.e., SC/SM, becomes close to 1. Therefore, considering the stability of sound image localization and a reduction in a high-frequency component due to the sound diffraction of a sound signal, a filter having a small number of taps has good approximation in this case. In the case, the apparatus having the structure shown in FIG. 9 can reduces the amount of memory required to store the coefficient further than the first example shown in FIG. 6. As a result, the amount of data held by the delaying unit becomes small, and it is possible to make the scale of the circuit smaller.

Figure 10:
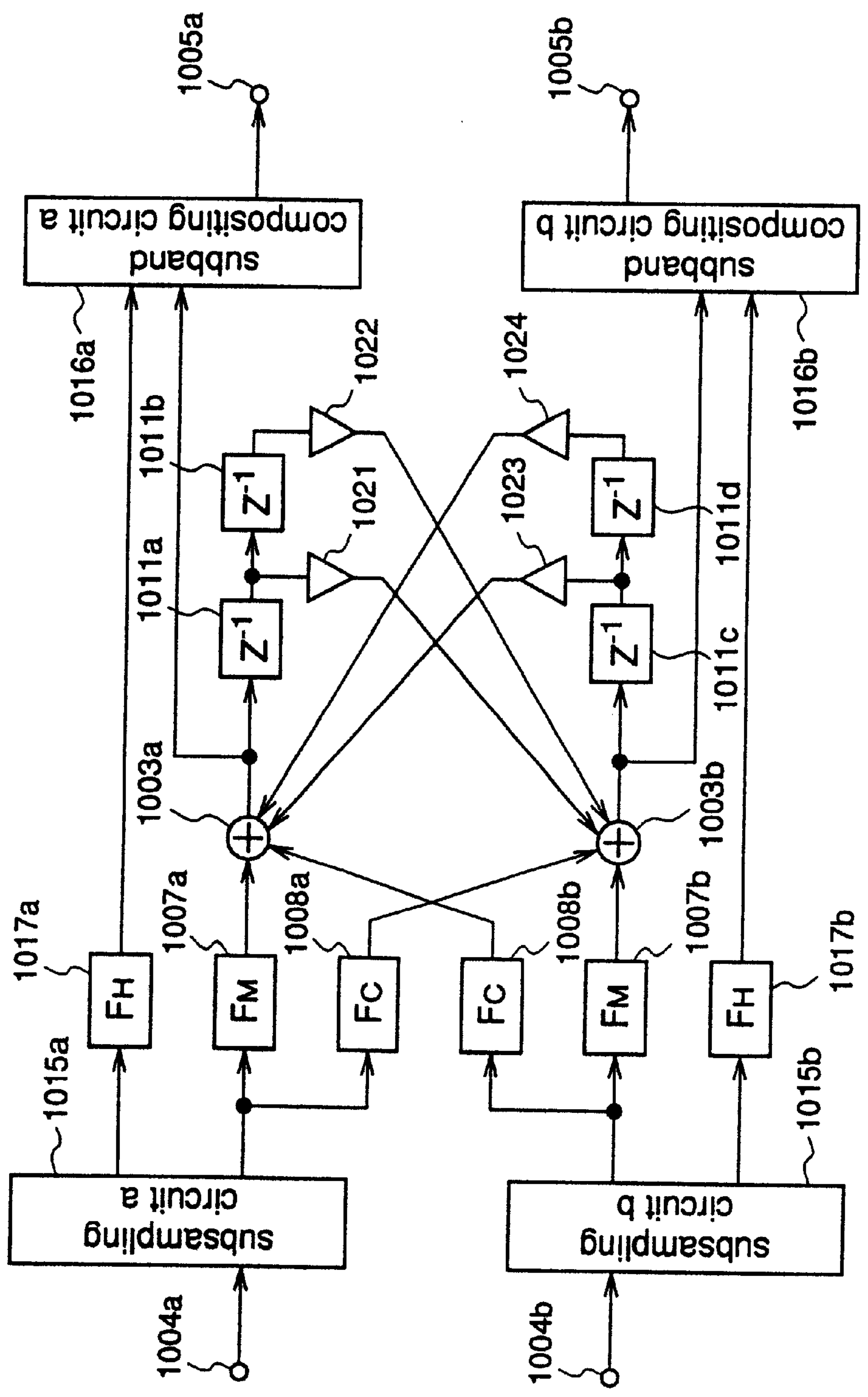
FIG. 10 is a block diagram showing a structure of an application example of the sound image localization apparatus of the third embodiment.
Figure 11:
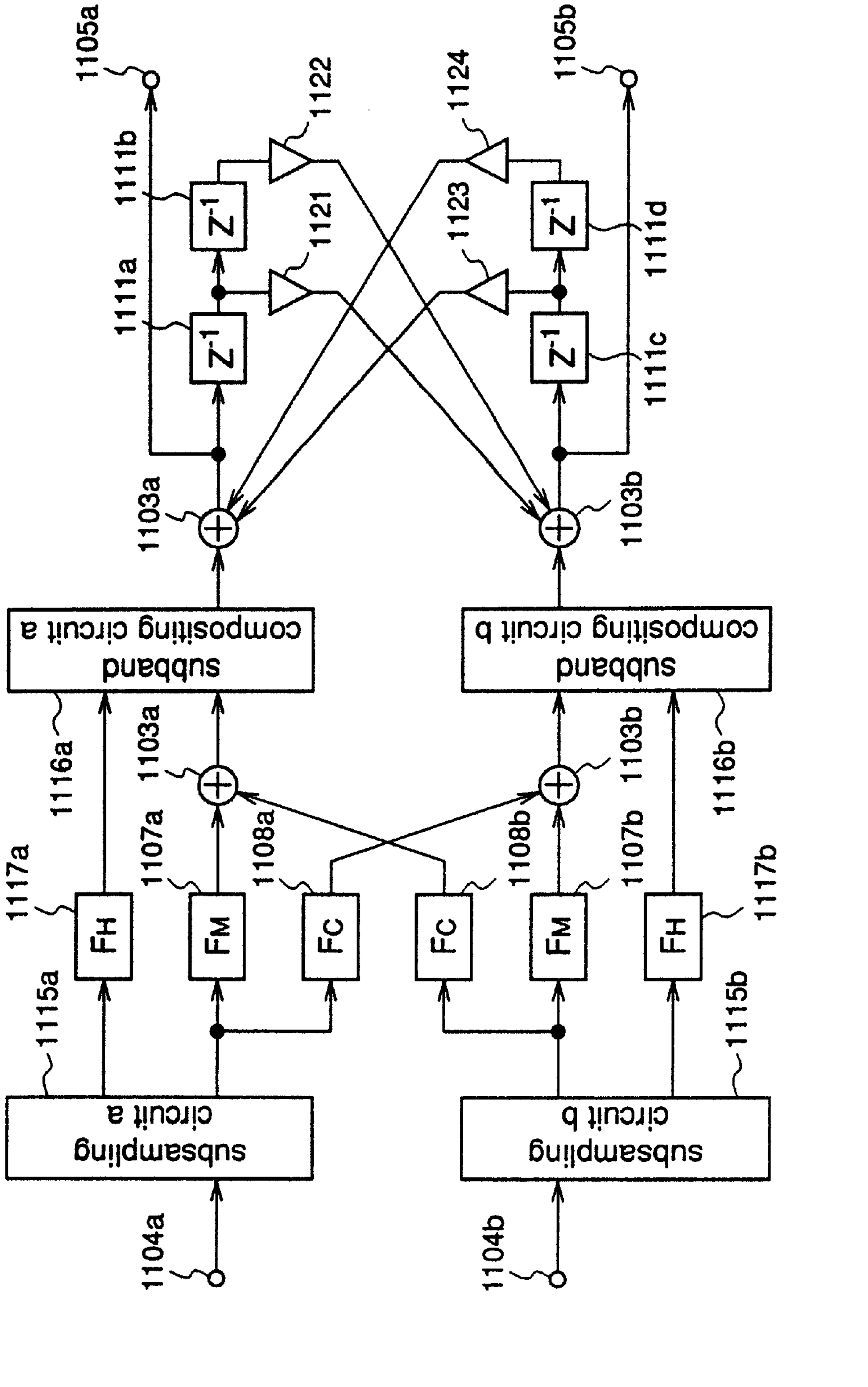
FIG. 11 is a block diagram showing a structure of an application example of the sound image localization apparatus of the third embodiment.

FIGS. 10 and 11 are diagrams showing a structure of a fourth example of the sound image localization of the third embodiment. As shown in FIG. 10, this example of the sound image localization apparatus includes a third example of the apparatus, and further comprises high-frequency main-path filters 1017*a* and 1017*b,* subsampling circuits 1015*a* and 1015*b,* and band compositing circuits 1016*a* and 1016*b*. These are similar to those shown in the second example of the second embodiment, i.e., the high-frequency main-path filters 217*a* and 217*b,* the subsampling circuits 215*a* and 215*b,* and the band compositing circuits 216*a* and 216*b*. The same with high-frequency main-path filters 1117*a* and 1117*b,* subsampling circuits 1115*a* and 1115*b,* and band compositing circuits 1116*a* and 1116*b,* shown in FIG. 11.

As to the operation of this example of the sound image localization apparatus, subsampling and band composition are similar to those in the second embodiment, and the other processes are similar to those in the third embodiment. Therefore, similar to the second example in the second embodiment and the third example in the second embodiment, this example of the sound image localization apparatus can reduce the required amount of memory and make the scale of the circuit smaller.

The crosstalk canceling signal generating filter as the FIR filter having two taps similar to the third example is disposed between the direction localizing filter and the band compositing circuit in the structure shown in FIG. 10, while being disposed at the rear of the band compositing circuit, i.e., on the output side, in the structure shown in FIG. 11. However, the crosstalk canceling signal generating filter may be disposed in front of the subsampling circuit, i.e., on the input side, or between the subsampling circuit and the direction localizing filter, and may receive only the low-frequency component output from the subsampling circuit as the target of processing, resulting in the similar effect.

As described above, the sound image localization apparatus in accordance with the third embodiment includes the comb filters in which the coefficients of the multipliers 610*x*1 to 610*x*10 shown in FIG. 6 are the same, whereby the operation using the filters requires only one parameter, i.e., the coefficient, and therefore, the amount of memory for holding the coefficient is reduced while making possible a high level of sound image localization.

Figure 18:
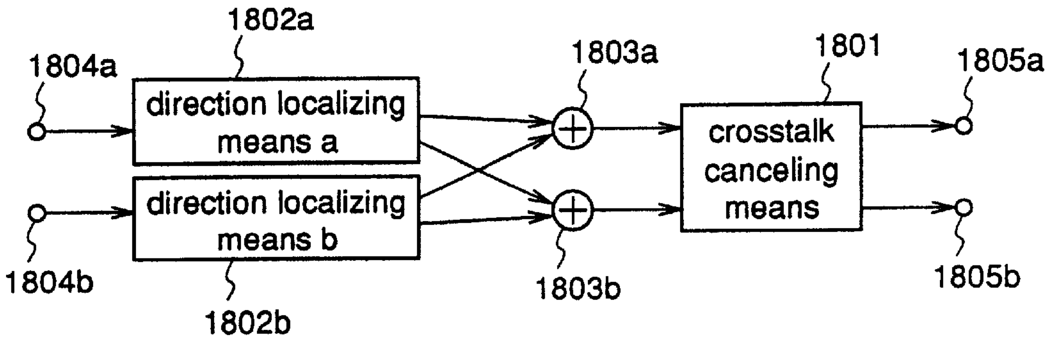
FIGS. 18(*a*) and 18(*b*) are block diagrams showing structures of a prior art sound image localization apparatus.
Figure 18:
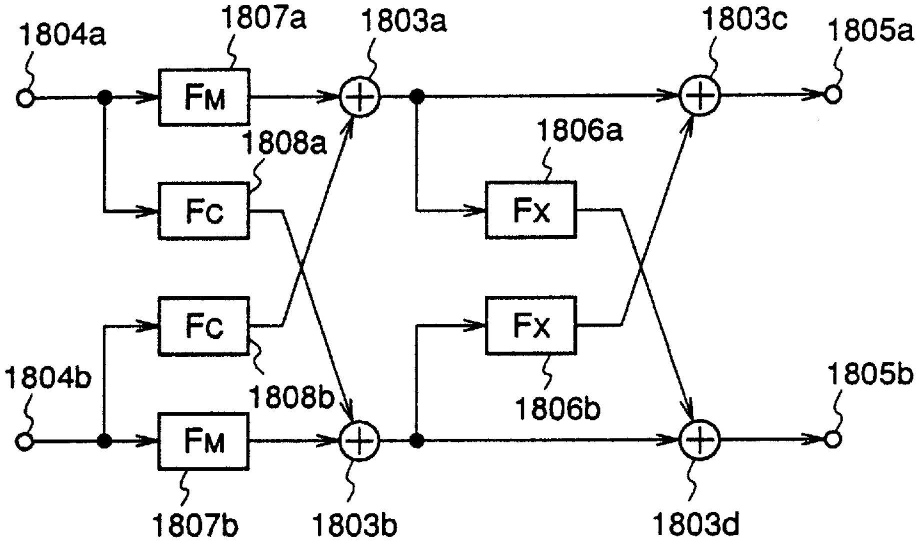

Although in the third embodiment the outline of the structure is the same as the feedback type sound image localization apparatus shown in FIGS. 1(*a*) and 1(*b*), the feedforward type sound image localization apparatus shown in FIG. 18(*b*) may be used, or a comb filter can be used for the sound image localization apparatus of the second embodiment shown in FIG. 2(*b*), resulting in the same effect.

Embodiment 4

A sound image localization apparatus in accordance with a fourth embodiment of this invention employs a circuit including delay buffers and accumulation registers (or memories) instead of comb filters of the third embodiment.

Figure 12:
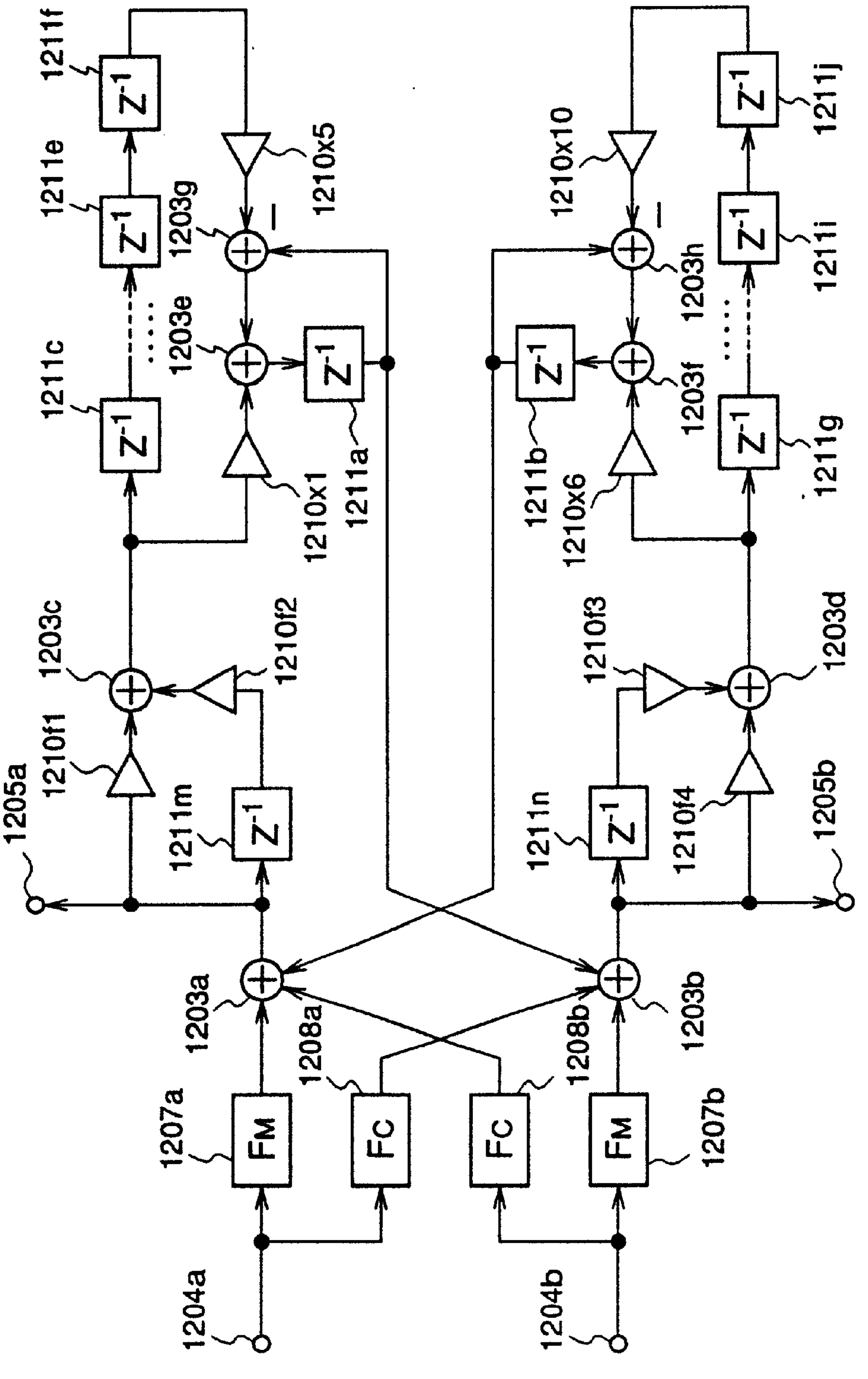
FIG. 12 is a block diagram showing a structure of a sound image localization apparatus in accordance with a fourth embodiment of this invention.

FIG. 12 is a block diagram showing a structure of the sound image localization apparatus of the fourth embodiment. The outline of the structure of the sound image localization apparatus of the fourth embodiment include the same feedback structure as shown in FIGS. 1(*a*) and 1(*b*), similar to the third embodiment. As shown in FIG. 12, the sound image localization apparatus comprises adders 1203*a,* 1203*b,* 1203*c,* and 1203*d,* main-path filters 1207*a* and 1207*b,* crosstalk-path filters 1208*a* and 1208*b,* delaying units 1211*a* to 1211*j,* and multipliers 1210*f*1 to 1210*f*4, 1210*x*1, and 1210*x*5, 1210*x*6, and 1210*x*10. Input sound signal are input through input terminals 1204*a* and 1204*b,* and subjected to signal processing, and the resulting signals are output through output terminals 1205*a* and 1205*b*. As in FIG. 3, dashed lines in the rows of the delaying units represent an arbitrary number of the delaying units.

In the figure, the portion including the adder 1203*c,* the multipliers 1210*f*1 and 1210*f*2, and the delaying unit 1211*m,* and the portion including the adder 1203*d,* the multipliers 1210*f*3 and 1210*f*4, and the delaying unit 1211*n* constitute low-pass filters similar to that in the second example of the third embodiment. In place of the comb filters constituting the crosstalk canceling signal generating filters (106*a* and 106*b* in FIG. 1(*b*)), the delaying units 1211*a,* 1211*b,* 1211*c* to 1211*f,* and 1211*g* to 1211*j,* the multipliers 1210*x*1, 1210*x*5, 1210*x*6, and 1210*x*10, and the adders 1203*e* to 1203*h* are included in the sound image localization apparatus of the fourth embodiment.

The comb filter included in the apparatus of the third embodiment shown in FIG. 6 performs the operation equivalent to calculating the average of data held in the delaying units 611*c* to 611*f* at a time so as to generate a crosstalk canceling signal at the time. Accordingly, based on the crosstalk canceling signal obtained at a certain time, the oldest among the data is reduced to one n-th, and one n-th of the newest data is added to the data. Thereby, a crosstalk canceling signal at a next time is obtained.

In the sound image localization apparatus shown in FIG. 12, the delaying units 1211*a* and 1211*b* hold immediately previous signals. Among data held by the delaying units 1211*c* to 1211*f* and 1211*g* to 1211*j*, the oldest data, i.e., the data held in the delaying units 1211*f* and 1211*j* having maximum delay in FIG. 12, are multiplied by one n-th in the multipliers 1210*x*5 and 1210*x*10, and the results are subtracted from the immediately previous signals by the adders 1203*g* and 1203*h*, respectively. Among the data held by the delaying units, the newest data, i.e., the data held in the delaying units 1211*c* and 1211*g* having minimum delay in FIG. 12, are multiplied by one n-th in the multipliers 1210*x*1 and 1210*x*6, and the results are added to the results of the subtraction by the adders 1203*e* and 1203*f*. The results of the addition are crosstalk canceling signals similar to that is obtained from the operation of the comb filter. The generated signals are held by the delaying units 1211*a* and 1211*b* to generate signals at a next time.

In the sound image localization apparatus of the fourth embodiment, the data held in the delaying units 1211*c* to 1211*f* and 1211*g* to 1211*j* are accessed only when the oldest data are taken and when the newest data are written. Since the delaying unit included in the comb filter of the third embodiment is frequently accessed, a high-speed memory is required. In contrast, a relatively low-speed memory can be employed for the delaying unit included in the fourth embodiment. The amounts of multiplication and addition are further reduced in the fourth embodiment than in the third embodiment. Thus, the sound image localization apparatus in accordance with the fourth embodiment solves the access time problem of a memory, i.e., (C) of the second problem, and the processing speed problem, i.e., the third problem.

As explained above, the sound image localization apparatus of the fourth embodiment includes delay buffers (the delaying units 1211*c* to 1211*f* and 1211*g* to 1211*j* in FIG. 12) and accumulation registers (the delaying units 1211*a* and 1211*b* in FIG. 12) as filters for crosstalk cancellation in place of the comb filter. Thereby, the incidence of access to a memory, and the loads of addition and multiplication are reduced. As a result, in a computer system implementing the sound image localization apparatus, even when the amount of a high-speed memory and the processing speed of a processor are limited, a high level of sound image localization is possible.

Similar to the second embodiment, the outline of the structure in the fourth embodiment is the same feedback type sound image localization apparatus as shown in FIGS. 1(*a*) and 1(*b*). However, the feedforward type apparatus shown in FIG. 18(*b*) is possible, and a circuit substituting the comb filter can be employed in the apparatus of the second embodiment shown in FIG. 2(*b*).

Embodiment 5

A sound image localization apparatus in accordance with a fifth embodiment of this invention can localize a sound image by switching the apparatus to feedforward or feedback.

Figure 13:
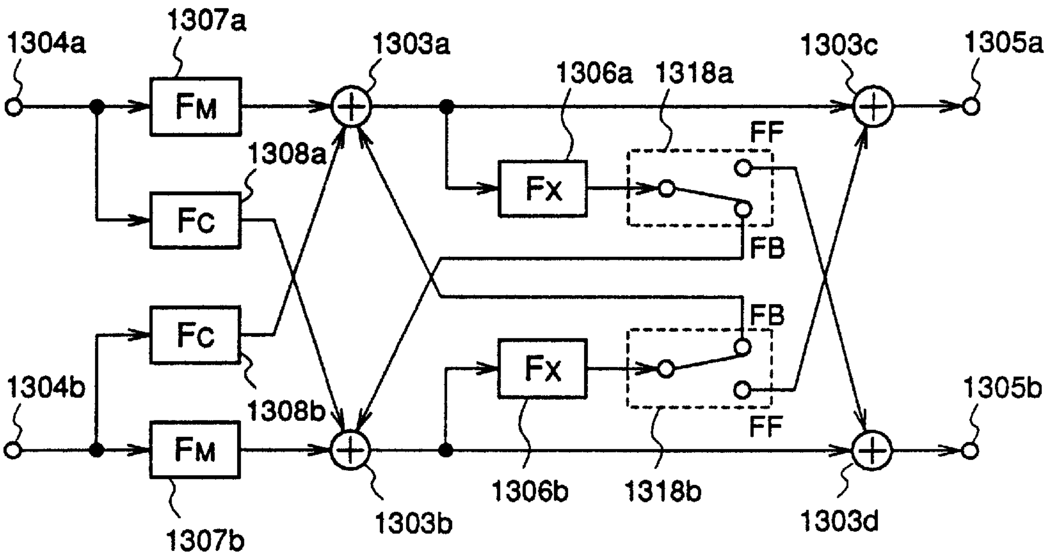
FIG. 13 is a block diagram showing a structure of a sound image localization apparatus in accordance with a fifth embodiment of this invention.

FIG. 13 is a diagram showing a structure of a first example of the sound image localization apparatus of the fifth embodiment. As shown in the figure, the sound image localization apparatus comprises the apparatus shown in FIGS. 1(*a*) and 1(*b*)and, further, adders 1303*c* and 1303*d*, and switches 1318*a* and 1318*b*.

FIG. 13 shows a case where the switches 1318*a* and 1318*b* both turn to feedback (an FB side in the figure). In this situation, crosstalk canceling signals generated by crosstalk canceling signal generating filters 1306*a* and 1306*b* are input to the adders 1303*a* and 1303*b*. That is, the crosstalk canceling signal is output to the input side, so the apparatus is a feedback type, and is equivalent to the apparatus shown in FIGS. 1(*a*) and 1(*b*). In this case, the apparatus of the fifth embodiment operates in a similar way to the apparatus of the first embodiment.

As opposed to this, when the switches 1318*a* and 1318*b* both turn to feedforward (an FF side in the figure), crosstalk canceling signals generated by crosstalk canceling signal generating filters 1306*a* and 1306*b* are input to the adders 1303*c* and 1303*d*. That is, the crosstalk canceling signal is output to the output side, so the apparatus is a feedforward type, and equivalent to the apparatus shown in FIG. 18(*b*). In this case, the apparatus of the fifth embodiment operates in a similar way to the apparatus in the prior art.

The sound image localization apparatus of the first embodiment, which is a feedback type, improves the reproducibility of the low-frequency component compared with the feedforward type apparatus. However, when a loudspeaker included in an acoustic system using the sound image localization apparatus is small in diameter, the large energy of the low-frequency component causes sound distortion. To improve this point, it might be considered to use a filter cutting off the low-frequency component. However, the additional filter leads to an increase in circuit scale and cost.

As opposed to this, the feedforward type apparatus has high-pass frequency characteristics which cut off the low-frequency component, and is suited to that system. Accordingly, the sound image localization apparatus of the fifth embodiment switches a feedback or feedforward type apparatus by the switches, so that when a loudspeaker with a large diameter is used, the apparatus operates as a feedback circuit so that good sound quality can be reproduced, while when a loudspeaker with a small diameter is used, the apparatus operates as a feedforward circuit so as to prevent sound distortion.

Thus, the sound image localization apparatus of the fifth embodiment includes the switches 1318*a* and 1318*b*, thereby becoming suited to an acoustic system, to which the apparatus is applied, by switching feedback and feedforward.

Figure 14:
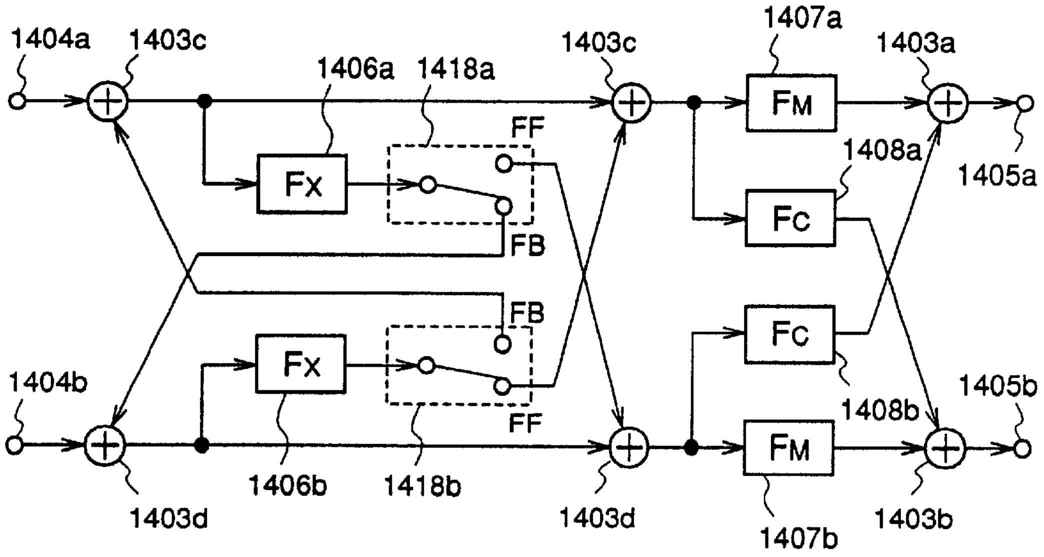
FIG. 14 is a block diagram showing a structure of an application example of the sound image localization apparatus of the fifth embodiment.
Figure 15:
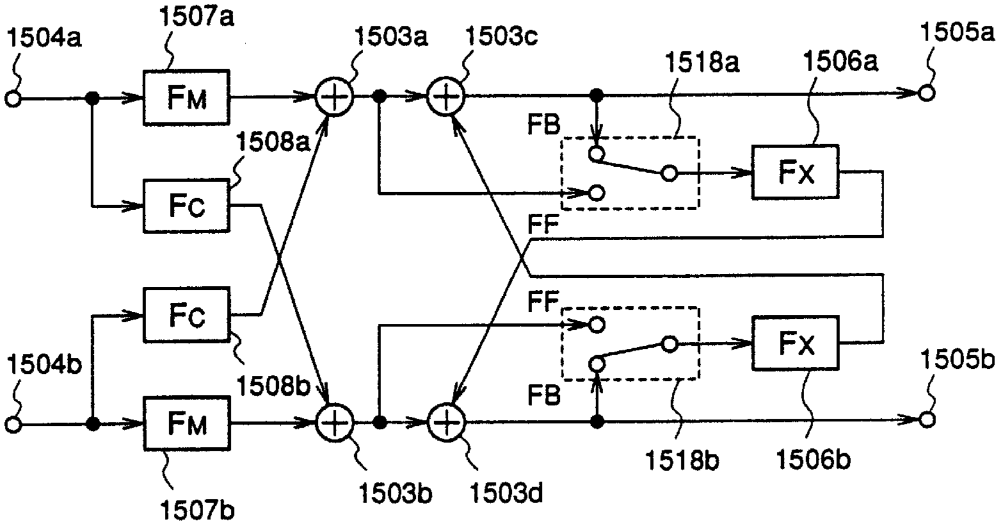
FIG. 15 is a block diagram showing a structure of an application example of the sound image localization apparatus of the fifth embodiment.

FIG. 14 is a diagram showing a structure of a second example of the sound image localization apparatus of the fifth embodiment. FIG. 15 is a diagram showing a structure of a third example of the sound image localization apparatus of the fifth embodiment. As shown in FIG. 14, the second example of the apparatus is the apparatus according to the second embodiment that crosstalk cancellation is performed on the input side, and further that switches are added. The third example of the apparatus shown in FIG. 15 comprises the feedback type apparatus in FIGS. 1(*a*) and 1(*b*) and, further, switches, as the first example does. While in the first example the switches are disposed at the rear of the crosstalk canceling signal generating filter, i.e., on the output side, in the third example the switches are disposed in front of the filter, i.e., on the input side. The second and third examples of the sound image localization apparatus shown in FIGS. 14 and 15 can be suited to an acoustic system by switching feedback and feedforward.

Embodiment 6

A sound image localization apparatus in accordance with a sixth embodiment has capability of changing an initial delay in generating a crosstalk canceling signal.

Figure 16:
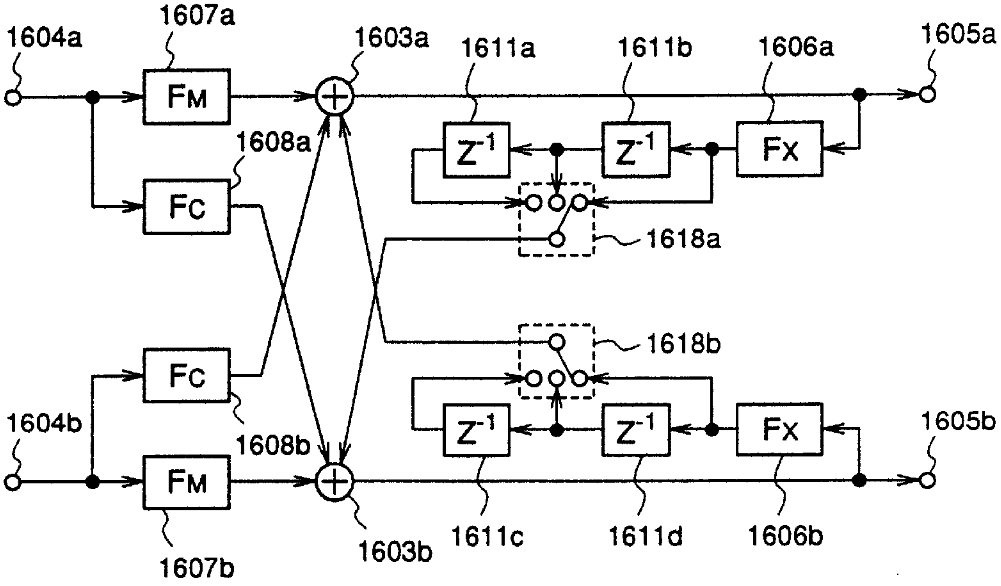
FIG. 16 is a block diagram showing a structure of a sound image localization apparatus in accordance which a sixth embodiment of this invention.

FIG. 16 is a diagram showing a structure of the sound image localization of the sixth embodiment. As shown in the figure, the sound image localization of the sixth embodiment is such that delaying units 1611*a* and 1611*d* and switches 1616*a* and 1618*b* are added to the feedback type apparatus shown in FIGS. 1(*a*) and 1(*b*).

In the situation shown in FIG. 16, the switches 1618*a* and 1618*b* are set in a way that the crosstalk canceling signal generating filters 1606*a* and 1606*b* output generated signals to the adders 1603*b* and 1603*a* without passing the signals through the delay units. In this situation, the sound image localization of the sixth embodiment is equivalent to the apparatus shown in FIGS. 1(*a*) and 1(*b*). The sound image localization apparatus of the sixth embodiment with this setting operates in a similar way to that described in the first embodiment.

The sound image localization apparatus can use delayed crosstalk canceling signals held in the delaying units 1611*b* and 1611*d*, or delayed crosstalk canceling signals held in the delaying units 1611*a* and 1611*c*, depending on the setting of the switches 1618*a* and 1618*b*, respectively. The sound image localization apparatus of the sixth embodiment with this setting operates in a similar way to that described in the first embodiment, except that the delayed crosstalk canceling signal is used for crosstalk cancellation.

In calculation by the crosstalk canceling signal generating filter, the input signal is multiplied by the coefficient shown in the equation 7-3, representing the ratio of the head related transfer functions SC and SM shown in FIG. 19(*b*). As is apparent from FIG. 19(*b*), as the crosstalk path is longer than the main path, there occurs a difference in the times of arrivals of sound signals from two loudspeakers. When the angle of the two loudspeakers is small, the difference in the arrival time is small. When the angle is large, the difference in the arrival time is large. This must be taken into account for sound image localization. In the crosstalk canceling signal generating filter, the arrival time difference is equivalent to the amount of an initial delay. Therefore, in an acoustic system using a sound image localization apparatus, when the fixed amount of an initial delay is used, if the positions of setting up the loudspeakers are changed, crosstalk cancellation is not possibly satisfactory.

In the crosstalk canceling signal generating filter, in cases except for initial delay, the frequency characteristics do not change to a large extent if the angle of two loudspeakers is around 30 to 60 degrees. The change in the angle can be coped with by switching initial delays. The sound image localization apparatus of the sixth embodiment can change the amount of an initial delay in a step-by-step manner by setting of the switches.

As described above, the sound image localization apparatus in accordance with the sixth embodiment further includes the delaying units 1611*a* to 1611*d* and the switches 1618*a* and 1618*b*, thereby performing a high level of sound image localization by coping with a case where the angle of two loudspeakers are changed in an acoustic system to which the apparatus is applied.

Embodiment 7

A sound image localization apparatus in accordance with a seventh embodiment changes a crosstalk canceling signal generating filter.

Figure 17:
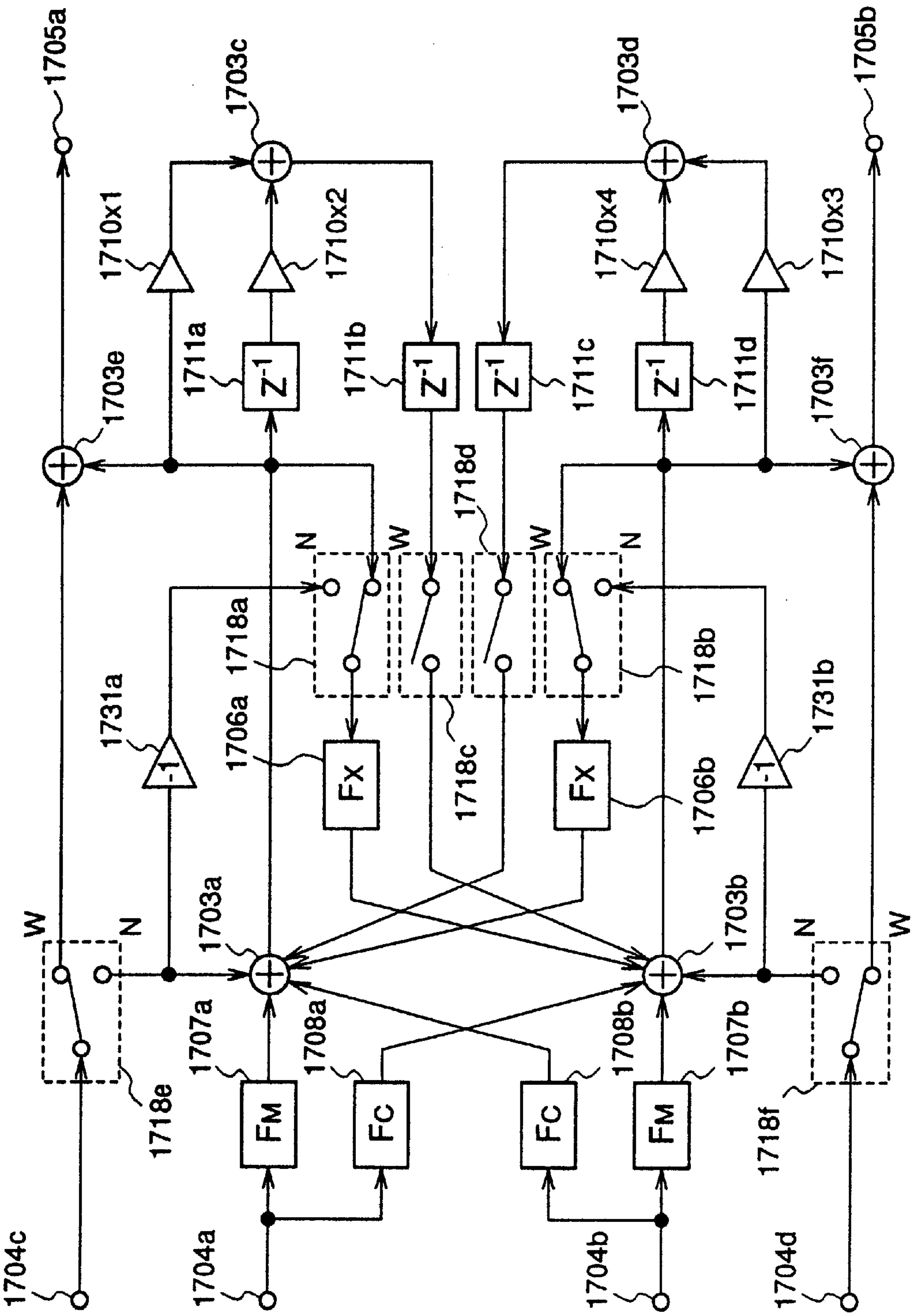
FIG. 17 is a block diagram showing a structure of a sound image localization apparatus in accordance with a seventh embodiment of this invention.

FIG. 17 is a block diagram showing a structure of the sound image localization apparatus of the seventh embodiment. As shown in the figure, the sound image localization apparatus comprises main-path filters 1707*a* and 1707*b*, crosstalk-path filters 1708*a* and 1708*b*, adders 1703*a* to 1703*f*, crosstalk canceling signal generating filters 1706*a* and 1706*b*, delaying units 1711*a* to 1711*d*, multipliers 1710*x*1 to 1710*x*4, inverting circuits 1731*a* and 1731*b*, and switches 1718*a* to 1718*f*. The apparatus receives input sound signals through input terminals 1704*a* to 1704*d*, and outputs processed signals through output terminals 1705*a* and 1705*b*.

The delaying units 1711*a* and 1711*b*, the multipliers 1710*x*1 and 1710*x*2, and the adder 1703*c* constitute a first FIR filter having two taps. The delaying units 1711*c* and 1711*d*, the multipliers 1710*x*3 and 1710*x*4, and the adder 1703*d* constitute a second FIR filter having two taps. Either filter functions as a crosstalk canceling signal generating filter. The switches 1718*a* to 1718*f* are switched depending on the distance between two loudspeakers of an acoustic system using the sound image localization apparatus.

The main-path filters 1707*a* and 1707*b*, the crosstalk-path filters 1708*a* and 1708*b*, the adders 1703*a* to 1703*d*, and the crosstalk canceling signal generating filters 1706*a* and 1706*b* are similar to those of the feedback type sound image localization apparatus shown in FIG. 1(*a*) and 1(*b*).

The operation of the sound image localization apparatus of the seventh embodiment will be described as to when the distance between two loudspeakers is wide or narrow.

At first, when the distance between two loudspeakers is wide, the switches 1718*a*, and 1718*b*, 1718*e*, and 1718*f* are set to respective W sides, while the switches 1718*c* and 1718*d* are set to be released. This is the situation shown in the figure. In this case, sound signals input through the input terminals 1704*c* and 1704*d* are output to the output terminals 1705*a* and 1706*b*, passing through the sound image localization apparatus of the seventh embodiment.

Signals input through the input terminals 1704*a* and 1704*b* are subjected to directional localization, and then, input through the switches 1718*a* and 1718*b* to the crosstalk canceling signal generating filters 1706*a* and 1706*b*. Thereafter, signals output from the first and second FIR filters each having two taps are not used because the switches 1718*c* and 1718*d* are released. Therefore, the operation of the apparatus is equivalent to that of the feedback type sound image localization apparatus shown in FIGS. 1(*a*) and 1(*b*).

As opposed to this, when the distance between the two loudspeakers is narrow, the switches 1718*a*, 1718*b*, 1718*e*, and 1718*f* are set to N sides, while the switches 1718*c* and 1718*d* are closed. Thus, signals after subjected to directional localization are processed by the first and second FIR filters each having two taps, and then, input through the switches 1718*c* and 1718*d* to the adders 1703*a* and 1703*b*. That is, the first and second FIR filters are used for crosstalk cancellation.

On the other hand, the phases of sound signals input through the input terminals 1704*c* and 1704*d* are inverted by the inverting circuits 1731*a* and 1731*b*, and then, input through the switches 1718*a* and 1718*b* to the filters 1706*a* and 1706*b*. The filters 1706*a* and 1706*b* generate signals based on the phase inverted signals, and output the generated signals to the adders 1703*a* and 1703*b*.

In this case, the channels to the adders 1703*a* and 1703*b* function as main paths due to the switches 1718*e* and 1718*f*, while the filters 1706*a* and 1706*b* generate crosstalk canceling signals. This is effective processing when a sound image to be localized at an arbitrary position (at the side or the rear) coexist in a sound signal. When the distance between two loudspeakers is narrow, if a sound image to be localized at the front is extended further outward, stereophony increases.

That is, in the apparatus of the seventh embodiment, a sound signal of the second image to be localized at the arbitrary position is input through the input terminals 1704*a* and 1704*b,* while sound a signal of the sound image to be localized at the front position is input through the input terminals 1704*c* and 1704*d.* When the distance between two loudspeakers is wide, the sound image to be localized at the front position is output as it is, while the sound image to be localized at the arbitrary position is subjected to crosstalk cancellation similar to that in the first embodiment. When the distance between the two loudspeakers is narrow, a crosstalk canceling signal is generated for the sound image to be localized at the front position to extend the sound image outward. On the other hand, for the sound image to be localized at the arbitrary position, the crosstalk canceling signal generating filter used for sound localization multiplies an input signal by the coefficient shown in the equation 7-3, representing the ratio of the head related transfer functions SC and SM shown in FIG. 19(*b*). Because the distance between the two loudspeakers is narrow, the ratio is small, so that it is possible to use a filter having a small number of taps. Therefore, the filter having two taps is used.

As described above, the sound image localization apparatus of the seventh embodiment comprises the conventional feedback type sound image localization apparatus and, further, the FIR filters with two taps comprising the delaying units 1711*a* to 1711*d,* the multipliers 1710*x*1 to 1710*x*4, and the adders 1703*c* and 1703*d,* the switches 1718*a* to 1718*d,* and the inverting circuits 1731*a* and 1731*b,* whereby when the distance between two loudspeakers is wide, the feedback sound localization similar to that in the first embodiment is performed, while when the distance between two loudspeakers is narrow, the outward extension of a sound image to be localized at the front is performed as well as the feedback sound localization.

Note that although the apparatus of the seventh embodiment is based on the feedback type sound image localization apparatus shown in FIGS. 1(*a*) and 1(*b*), the apparatus of the seventh embodiment can be based on the feedforward type apparatus shown in FIG. 18(*b*) or the apparatus of the second embodiment shown in FIG. 2(*b*).

What is claimed is:

1. A sound image localization apparatus receiving a sound signal, performing signal processing to the sound signal, localizing a virtual sound image, and outputting a sound image localization signal, said apparatus comprising:

(a) direction localizing means for localizing the direction of a virtual sound source position; and (b) crosstalk canceling means for performing crosstalk cancellation and including (1) a crosstalk canceling signal generating filter generating a crosstalk canceling signal and outputting the crosstalk canceling signal toward the direction where the sound signal is input; and (2) a switch for switching the crosstalk canceling signal generated by said crosstalk canceling signal generating filter to one of the output side of said crosstalk canceling signal generating filter and the input.

2. The sound image localization apparatus of claim 1 wherein said crosstalk canceling means performs crosstalk cancellation to a signal generated by directional localization of said direction localizing means.

3. The sound image localization apparatus of claim 1 wherein said direction localizing means perform directional localization to a signal generated by crosstalk cancellation of said crosstalk canceling means.

4. The sound image localization apparatus of claim 3 wherein said crosstalk canceling means comprises first and second crosstalk canceling signal generating filters, and first and second adders, said first adder adding a first sound signal and a signal generated by said second crosstalk canceling signal generating filter, and said second adder adding a second sound signal and a signal generated by said first crosstalk canceling signal generating filter;

said direction localizing means comprise first and second main-path filters, first and second crosstalk-path filters, and fist and second adders, said first adder adding a signal processed by said first main-path filter and a signal processed by said second crosstalk-path filter, and said second adder adding a signal processed by said second main-path filter and a signal processed by said first crosstalk-path filter.

5. The sound image localization apparatus of claim 1 wherein said crosstalk canceling means use a comb filter to generate the crosstalk canceling signal.

6. The sound image localization apparatus of claim 5 wherein said apparatus further comprises a low-pass filter processing a signal input to or output from said crosstalk canceling means.

7. The sound image localization apparatus of claim 1 wherein said crosstalk canceling means hold the crosstalk canceling signal generated at a certain time, delay the crosstalk canceling signal held, hold the plurality of crosstalk canceling signals delayed, and multiply some of the plurality of crosstalk canceling signals held, by a predetermined coefficient to generate the crosstalk canceling signal at a time following the certain time.

8. The sound image localization appartus of claim 7 wherein said apparatus further comprises a low-pass filter processing a signal input to or output from said crosstalk canceling means.

9. The sound image localization apparatus of claim 1, and further comprising a delay unit for delaying a signal input to or output from said crosstalk canceling signal generating filter by various times.

10. A sound image localization apparatus receiving a sound signal, performing signal processing to the sound signal, localizing a virtual sound image, and outputting a sound image localization signal, said apparatus comprising:

direction localizing means for localizing the direction of a virtual sound source position, said apparatus processing an input sound signal to be localized in a first direction and in a second direction; and crosstalk canceling means for performing crosstalk cancellation by generating a crosstalk canceling signal and outputting the crosstalk canceling signal toward the direction of where the sound signal is input, said crosstalk canceling means including a fist filter having a certain number of taps, a second filter different from said first filter, and a switch switching between first and second modes, in the first mode said first filter functioning as a filter generating the crosstalk canceling signal, and in the second mode said second filter functioning as a filter generating the crosstalk canceling signal while said first filter functions as a filter localizing the second direction.

* * * * *

UNITED STATES PATENT AND TRADEMARK OFFICE

CERTIFICATE OF CORRECTION

PATENT NO. : 6,285,766 B1

DATED : September 4, 2001

INVENTOR(S) : Kumamoto

It is certified that error appears in the above-identified patent and that said Letters Patent is hereby corrected as shown below:

Drawings,
Delete drawing sheets consisting of Figs. 3&4, and substitute therefor the drawing sheets consisting of Figs. 3&4, as shown on the attached pages.

Signed and Sealed this

First Day of October, 2002

*Attest:*

JAMES E. ROGAN

*Attesting Officer*

*Director of the United States Patent and Trademark Office*